US011323989B2

(12) United States Patent
Zhang et al.

(10) Patent No.: US 11,323,989 B2
(45) Date of Patent: May 3, 2022

(54) METHOD AND APPARATUS FOR BANDWIDTH INDICATION IN UNLICENSED SPECTRUM

(71) Applicant: Huawei Technologies Co., Ltd., Shenzhen (CN)

(72) Inventors: Jiayin Zhang, Kanata (CA); Mohamed Adel Salem, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/904,522

(22) Filed: Feb. 26, 2018

(65) Prior Publication Data

US 2019/0268883 A1     Aug. 29, 2019

(51) Int. Cl.
| | |
|---|---|
| *H04W 72/04* | (2009.01) |
| *H04W 16/14* | (2009.01) |
| *H04L 5/00* | (2006.01) |
| *H04W 88/08* | (2009.01) |

(52) U.S. Cl.
CPC ............. *H04W 72/042* (2013.01); *H04L 5/00* (2013.01); *H04W 16/14* (2013.01); *H04W 88/08* (2013.01)

(58) Field of Classification Search
CPC .... H04W 72/042; H04W 16/14; H04W 88/08
See application file for complete search history.

(56) References Cited

U.S. PATENT DOCUMENTS

| | | | |
|---|---|---|---|
| 2014/0254452 A1* | 9/2014 | Golitschek Edler Von Elbwart | H04W 52/0216 370/311 |
| 2016/0007350 A1* | 1/2016 | Xiong | H04W 24/10 370/252 |
| 2016/0050667 A1* | 2/2016 | Papasakellariou | H04W 74/0808 370/329 |
| 2016/0242186 A1 | 8/2016 | Nissila | |
| 2017/0013479 A1* | 1/2017 | Sun | H04W 28/0236 |
| 2017/0238330 A1* | 8/2017 | Jiang | H04W 24/10 370/329 |
| 2017/0303246 A1 | 10/2017 | Wang et al. | |
| 2018/0007688 A1* | 1/2018 | Fu | H04L 5/0048 |
| 2018/0077689 A1* | 3/2018 | Rico Alvarino | H04W 72/042 |
| 2018/0183551 A1* | 6/2018 | Chou | H04W 72/042 |
| 2018/0255586 A1* | 9/2018 | Einhaus | H04L 5/00 |
| 2018/0270798 A1* | 9/2018 | Park | H04W 72/042 |

(Continued)

FOREIGN PATENT DOCUMENTS

| | | |
|---|---|---|
| CN | 105007627 A | 10/2015 |
| EP | 3122123 A1 | 1/2017 |

OTHER PUBLICATIONS

Vivo, "Potential solutions and techniques for NR unlicensed spectrum," 3GPP TSG RAN WG1 Meeting #92 R1-1801557, Feb. 26-Mar. 2, 2018, 6 Pages, Athens, Greece.

(Continued)

*Primary Examiner* — Jeffrey M Rutkowski
*Assistant Examiner* — Jasper Kwoh
(74) *Attorney, Agent, or Firm* — Slater Matsil, LLP

(57) ABSTRACT

Methods and apparatus that support dynamic bandwidth changes for downlink transmissions in unlicensed spectrum are provided. The provided methods and apparatus provide acquired bandwidth indications through downlink control information (DCI) for bandwidth(s) acquired within an unlicensed spectrum bandwidth part (BWP) or component carrier (CC).

31 Claims, 10 Drawing Sheets

(56) References Cited

U.S. PATENT DOCUMENTS

| | | | |
|---|---|---|---|
| 2018/0279289 A1* | 9/2018 | Islam | H04W 72/048 |
| 2018/0324753 A1* | 11/2018 | Islam | H04W 48/12 |
| 2018/0324843 A1* | 11/2018 | Lee | H04W 72/1289 |
| 2019/0044649 A1* | 2/2019 | Kim | H04L 1/00 |
| 2019/0141734 A1 | 5/2019 | Lei et al. | |
| 2019/0182675 A1* | 6/2019 | Pu | H04W 16/14 |
| 2019/0200345 A1* | 6/2019 | Zhang | H04W 72/1289 |
| 2019/0342858 A1* | 11/2019 | Tang | H04W 68/02 |
| 2020/0236677 A1* | 7/2020 | Cui | H04W 24/02 |
| 2020/0344819 A1* | 10/2020 | Myung | H04W 74/0808 |

OTHER PUBLICATIONS

Huawei et al., "Resource allocation and indication for data channel", 3GPP TSG RAN WG1 Meeting #88bis, R1-1705069, Apr. 3-7, 2017, 8 Pages, Spokane, USA.

\* cited by examiner

METHOD AND APPARATUS FOR BANDWIDTH INDICATION IN UNLICENSED SPECTRUM

FIELD

The present disclosure relates generally to wireless communications and, in particular, to bandwidth indication via downlink control information and associated methods and apparatus.

BACKGROUND

In wireless communication systems, an electronic device (ED), such as a user equipment (UE), wirelessly communicates with a Transmission and Receive Point (TRP), termed "base station", to send data to the ED and/or receive data from the ED. A wireless communication from an ED to a base station is referred to as an uplink (UL) communication. A wireless communication from a base station to an ED is referred to as a downlink (DL) communication.

Resources are required to perform uplink and downlink communications. For example, an ED may wirelessly transmit data to a base station in an UL transmission at a particular frequency and during a particular time slot. The frequency and time slot used is an example of a physical communication resource.

Some modes of communication may enable communications with an ED over an unlicensed spectrum band, or over different spectrum bands (e.g., an unlicensed spectrum band and/or a licensed spectrum band) of a wireless network. Given the scarcity and expense of bandwidth in the licensed spectrum, exploiting the vast and free-of-charge unlicensed spectrum to offload at least some communication traffic is an approach that has garnered interest from mobile broadband (MBB) network operators. For example, in some cases downlink transmissions may be transmitted over an unlicensed spectrum band. Accordingly, efficient and fair mechanisms for downlink transmissions in the unlicensed spectrum are desirable.

SUMMARY

As noted above, given the scarcity and expense of bandwidth in the licensed spectrum, and the increasing demand for data transmission capacity, there is increasing interest in offloading at least some communication traffic, such as downlink communication traffic, to the unlicensed spectrum. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary.

There is also an interest in supporting bandwidths wider than the common 20 MHz component carrier (CC) bandwidths in both licensed and unlicensed spectrum. For example, Long Term Evolution (LTE) Licensed-Assisted Access (LAA) and enhanced LAA (eLAA) of 3GPP Rel 13 and Rel 14, respectively, aimed at porting the spectral-efficient MBB air interface (AI) to the vast and free-of-charge unlicensed spectrum through aggregating unlicensed component carriers (CCs) at the operator's small cells with the assistance of the anchor licensed carriers. In LTE LAA, carrier aggregation (CA) of at most 31×20 MHz CCs is supported to make use of the 5 GHz unlicensed spectrum using a total bandwidth larger than 20 MHz.

Wideband operation is also being contemplated in future wireless communication systems, such as the wireless communication systems being contemplated in the development of the 5G New Radio (NR) standard. For example, 5G NR will likely support a bandwidth part (BWP)/CC larger than 20 MHz, e.g., 80 MHz or larger.

To present a global unlicensed solution, regulatory requirements such as Listen-Before-Talk (LBT) procedures have to be imposed on the medium access design for unlicensed spectrum. In 5G NR-based access to the unlicensed spectrum (NR-U), one or more sub-bands of the wideband BWP or CC may be unavailable for a given transmission opportunity due to dynamic narrow band interference. For example, one or more 20 MHz sub-bands of an 80 MHz BWP or CC may be unavailable due to narrow band interference. Sub-band(s) of the wideband BWP or CC that are found to be available through the LBT procedure may be accessed for downlink transmission, and are therefore referred to as "acquired" bandwidth(s) because they are part of the frequency/time resource acquired from unlicensed spectrum, for downlink transmission, as a result of the LBT procedure.

Decoding performance for downlink transmissions and retransmissions on a wideband BWP or CC can potentially be improved in an ED if the ED is aware of the acquired bandwidths within the wideband BWP or CC, i.e., the sub-bands within the wideband BWP or CC that may carry a downlink transmission burst relevant to the ED.

This is not a problem for the multiple CC approach in LTE LAA because it is based on carrier aggregation, in which an ED is able to determine if a given 20 MHz CC is acquired by monitoring for a cell specific reference signal on the corresponding CC. In other communication systems that operate in unlicensed spectrum, such as communications systems that operate in accordance with IEEE 802.11ac/ax, the available bandwidth is indicated in the preamble (VHT-SIG-A/HE-SIG-A) of a downlink transmission burst and EDs (referred to as stations or STAs in IEEE 802.11ac/ax) determine the acquired bandwidth by synchronizing with the legacy preamble and reading the bandwidth info through VHT-SIG-A/HE-SIG-A.

However, in 5G NR-U, there will likely be no cell-specific reference signal on the corresponding CC (e.g., the Cell-specific Reference Signal used in LTE LAA) transmitted to provide detection of CC/BWP existence in the downlink; therefore, the solution used in LTE LAA will likely not be suitable for 5G NR-U. Furthermore, due to the timing requirements associated with having to immediately transmit after a successful LBT procedure in order to comply with regulatory requirements, the solution used in IEEE 802.11ac/ax is also likely not suitable for 5G NR-U because practical hardware limitations prevent changing the physical downlink control channel (PDCCH) and physical downlink shared channel (PDSCH) immediately after the LBT. In addition, the resource allocation (transport block (TB)/code block (CB)) in 5G NR-U will likely be across sub-band LBT boundaries, which means that the decoding performance may be degraded if an ED does not have knowledge of the exact bandwidth the transmission occupied.

Aspects of the present disclosure address the challenges of wideband downlink transmission in the unlicensed spectrum for 5G NR by providing mechanisms for a base station to transmit an acquired bandwidth indication through downlink control information (DCI). For example, in some embodiments the bandwidth indication may be transmitted via a group-common PDCCH or a UE-specific PDCCH.

According to a first aspect the present disclosure provides a method for a base station in a wireless network. The method includes transmitting, from a base station, downlink control information (DCI) on at least one configured control resource set (CORESET) of a plurality of CORESETs configured in the frequency and/or time domain, each configured CORESET of the plurality of configured CORESETs corresponding to a respective frequency domain and/or time domain search space within an unlicensed spectrum bandwidth part (BWP) or component carrier (CC). The DCI may be transmitted within a configured monitoring window within a configured monitoring period in the time domain, and wherein the DCI comprises an acquired bandwidth indication for indicating at least one bandwidth within the unlicensed spectrum BWP or CC.

In some embodiments of the first aspect of the present disclosure, for each of the at least one bandwidth indicated, the acquired bandwidth indication corresponds to a period of time associated with the indicated bandwidth, the period of time being defined in terms of at least one of: a number of time units before a time unit in which the DCI is transmitted; a number of time units after the time unit in which the DCI is transmitted; a first time period before the time at which the DCI is transmitted; and a second time period after the time at which the DCI is transmitted.

In some embodiments of the first aspect of the present disclosure, the acquired bandwidth indication indicates at least one acquired bandwidth for downlink transmission within the unlicensed spectrum BWP or CC, or the acquired bandwidth indication indicates at least one punctured bandwidth that is not used for transmission within the unlicensed spectrum BWP or CC.

In some embodiments of the first aspect of the present disclosure, the acquired bandwidth indication indicates at least one acquired bandwidth for downlink transmission within the unlicensed spectrum BWP or CC, the downlink transmission being initiated by the base station within an indication period defined at or after the end of a preceding monitoring window and up to the end of a downlink transmission burst in which the DCI carrying the acquired bandwidth indication is transmitted.

In some embodiments of the first aspect of the present disclosure, the indication period comprises a plurality of segments of time and the acquired bandwidth indication indicates a respective bandwidth for each segment of time.

In some embodiments of the first aspect of the present disclosure, the indication period is defined in terms of a number of time units, downlink transmission bursts transmitted by the base station have starting and/or ending points that are aligned to boundaries of the time units, the acquired bandwidth indication indicates a starting time unit or an ending time unit of a time period associated with each of the at least one acquired bandwidth, and the starting time unit or the ending time unit of the time period aligns with the staring or ending point of the at least one downlink transmission burst, respectively.

According to a second aspect the present disclosure provides a method for an electronic device (ED) in a wireless network. The method includes receiving, from a base station, DCI on at least one configured CORESET of a plurality of CORESETs configured in the frequency and/or time domain, each configured CORESET of the plurality of configured CORESETs corresponding to a respective frequency domain and/or time domain search space within an unlicensed spectrum BWP or CC. The DCI may be received within a configured monitoring window within a configured monitoring period in the time domain, and wherein the DCI comprises an acquired bandwidth indication for indicating at least one bandwidth within the unlicensed spectrum BWP or CC.

In some embodiments of the second aspect of the present disclosure, the method further includes receiving, from the base station, configuration information to configure the ED to periodically monitor, within the configured monitoring window of each configured monitoring period, for the DCI on the corresponding frequency domain and/or time domain search space of each of the plurality of configured CORESETs.

In some embodiments of the second aspect of the present disclosure, for each of the at least one bandwidth indicated, the acquired bandwidth indication corresponds to a period of time associated with the indicated bandwidth, the period of time being defined in terms of at least one of: a number of time units before a time unit in which the DCI is received; a number of time units after the time unit in which the DCI is received; a first time period before the time at which the DCI is received; and a second time period after the time at which the DCI is received.

In some embodiments of the second aspect of the present disclosure, the acquired bandwidth indication indicates at least one acquired bandwidth for downlink transmission within the unlicensed spectrum BWP or CC, or the acquired bandwidth indication indicates at least one punctured bandwidth that is not used for transmission within the unlicensed spectrum BWP or CC.

In some embodiments of the second aspect of the present disclosure, the acquired bandwidth indication indicates at least one acquired bandwidth for downlink transmission within the unlicensed spectrum BWP or CC, the downlink transmission being initiated by the base station within an indication period defined at or after the end of a preceding monitoring window and up to the end of a downlink transmission burst in which the DCI carrying the acquired bandwidth indication is received.

In some embodiments of the second aspect of the present disclosure, the indication period comprises a plurality of segments of time, and the acquired bandwidth indication indicates a respective bandwidth for each segment of time.

In some embodiments of the second aspect of the present disclosure, the indication period is defined in terms of a number of time units, downlink transmission bursts transmitted by the base station have starting and/or ending points that are aligned to boundaries of the time units, the acquired bandwidth indication indicates a starting time unit or an ending time unit of a time period associated with each of the at least one acquired bandwidth, and the starting time unit or the ending time unit of the time period aligns with the staring or ending point of the at least one downlink transmission burst, respectively.

In some embodiments of the second aspect of the present disclosure, the method further includes for each of the at least one acquired bandwidth, determining the acquired bandwidth is relevant to a PDSCH for the ED by comparing a starting time unit associated with the PDSCH to the starting time unit indicated by the acquired bandwidth indication, or by comparing an ending time unit associated with the PDSCH to the ending time unit indicated by the acquired bandwidth indication.

According to a third aspect the present disclosure provides a base station that includes a wireless receiver, a wireless transmitter, and a processing unit operatively connected to the wireless receiver and the wireless transmitter. The processing unit is configured to transmit DCI on at least one configured CORESET of a plurality of CORESETs configured in the frequency and/or time domain, each configured CORESET of the plurality of configured CORESETs corresponding to a respective frequency domain and/or time domain search space within an unlicensed spectrum BWP or CC. The processing unit may be configured to transmit the DCI within a configured monitoring window within a configured monitoring period in the time domain, and wherein the DCI comprises an acquired bandwidth indication for indicating at least one bandwidth within the unlicensed spectrum BWP or CC.

In some embodiments of the third aspect of the present disclosure, for each of the at least one bandwidth indicated, the acquired bandwidth indication corresponds to a period of time associated with the indicated bandwidth, the period of time being defined in terms of at least one of: a number of time units before a time unit in which the DCI is transmitted; a number of time units after the time unit in which the DCI is transmitted; a first time period before the time at which the DCI is transmitted; and a second time period after the time at which the DCI is transmitted.

In some embodiments of the third aspect of the present disclosure, the acquired bandwidth indication indicates at least one acquired bandwidth for downlink transmission within the unlicensed spectrum BWP or CC, or the acquired bandwidth indication indicates at least one punctured bandwidth that is not used for transmission within the unlicensed spectrum BWP or CC.

In some embodiments of the third aspect of the present disclosure, the acquired bandwidth indication indicates at least one acquired bandwidth for downlink transmission within the unlicensed spectrum BWP or CC, the downlink transmission being initiated by the base station within an indication period defined at or after the end of a preceding monitoring window and up to the end of a downlink transmission burst in which the DCI carrying the acquired bandwidth indication is transmitted.

In some embodiments of the third aspect of the present disclosure, the indication period comprises a plurality of segments of time, and the acquired bandwidth indication indicates a respective bandwidth for each segment of time.

In some embodiments of the third aspect of the present disclosure, the indication period is defined in terms of a number of time units, downlink transmission bursts transmitted by the base station have starting and/or ending points that are aligned to boundaries of the time units, the acquired bandwidth indication indicates a starting time unit or an ending time unit of a time period associated with each of the at least one acquired bandwidth, and the starting time unit or the ending time unit of the time period aligns with the staring or ending point of the at least one downlink transmission burst, respectively.

According to a fourth aspect the present disclosure provides an ED that includes a wireless receiver, a wireless transmitter, and a processing unit operatively connected to the wireless receiver and the wireless transmitter. The processing unit is configured to receive, from a base station, DCI on at least one configured CORESET of a plurality of CORESETs configured in the frequency and/or time domain, each configured CORESET of the plurality of configured CORESETs corresponding to a respective frequency domain and/or time domain search space within an unlicensed spectrum BWP or CC. The processing unit is configured to receive the DCI within a configured monitoring window within a configured monitoring period in the time domain, and wherein the DCI comprises an acquired bandwidth indication for indicating at least one bandwidth within the unlicensed spectrum BWP or CC.

In some embodiments of the fourth aspect of the present disclosure, the processing unit is further configured to receive, from the base station, configuration information to configure the ED to periodically monitor, within the configured monitoring window of each configured monitoring period, for the DCI on the corresponding frequency domain and/or time domain search space of each of the plurality of configured CORESETs.

In some embodiments of the fourth aspect of the present disclosure, for each of the at least one bandwidth indicated, the acquired bandwidth indication corresponds to a period of time associated with the indicated bandwidth, the period of time being defined in terms of at least one of: a number of time units before a time unit in which the DCI is received; a number of time units after the time unit in which the DCI is received; a first time period before the time at which the DCI is received; and a second time period after the time at which the DCI is received.

In some embodiments of the fourth aspect of the present disclosure, the acquired bandwidth indication indicates at least one acquired bandwidth for downlink transmission within the unlicensed spectrum BWP or CC, or the acquired bandwidth indication indicates at least one punctured bandwidth that is not used for transmission within the unlicensed spectrum BWP or CC.

In some embodiments of the fourth aspect of the present disclosure, the acquired bandwidth indication indicates at least one acquired bandwidth for downlink transmission within the unlicensed spectrum BWP, the downlink transmission being initiated by the base station within an indication period defined at or after the end of a preceding monitoring window and up to the end of a downlink transmission burst in which the DCI carrying the acquired bandwidth indication is received.

In some embodiments of the fourth aspect of the present disclosure, the indication period comprises a plurality of segments of time, and the acquired bandwidth indication indicates a respective bandwidth for each segment of time.

In some embodiments of the fourth aspect of the present disclosure, the indication period is defined in terms of a number of time units, downlink transmission bursts transmitted by the base station have starting and/or ending points that are aligned to boundaries of the time units, the acquired bandwidth indication indicates a starting time unit or an ending time unit of a time period associated with each of the at least one acquired bandwidth, and the starting time unit or the ending time unit of the time period aligns with the staring or ending point of the at least one downlink transmission burst, respectively.

In some embodiments of the fourth aspect of the present disclosure, the processing unit is further configured to determine, for each of the at least one acquired bandwidth, the acquired bandwidth is relevant to a PDSCH for the ED by comparing a starting time unit associated with the PDSCH to the starting time unit indicated by the acquired bandwidth indication, or by comparing an ending time unit associated with the PDSCH to the ending time unit indicated by the acquired bandwidth indication.

BRIEF DESCRIPTION OF THE DRAWINGS

Embodiments of the present disclosure will be described in greater detail with reference to the accompanying drawings.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

As noted above, Aspects of this disclosure provide mechanisms for a base station to transmit an acquired bandwidth indication through a group-common PDCCH.

Turning now to the figures, some specific example embodiments will be described.

Communication System

Figure 1:
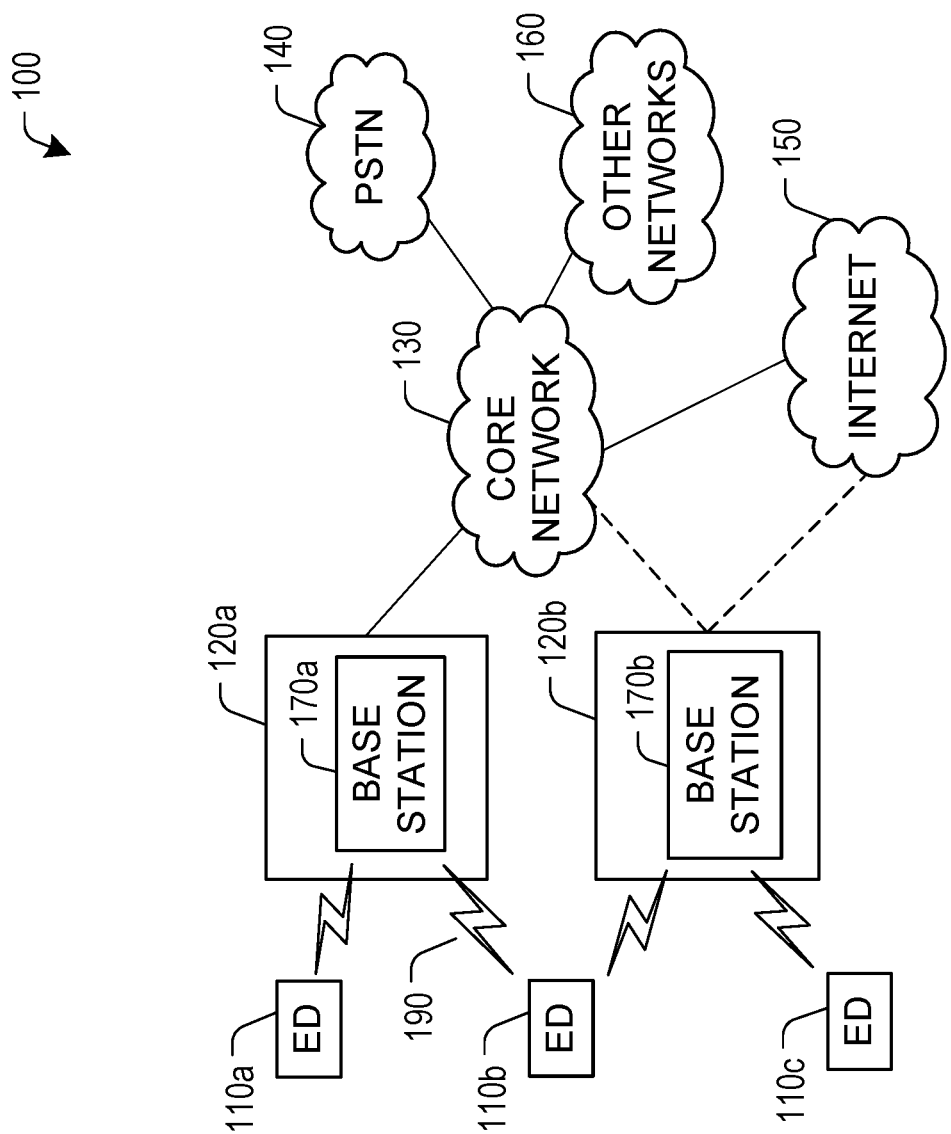
FIG. 1 is a schematic diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Unlicensed Spectrum Access

As noted above, given the scarcity and expense of bandwidth in the licensed spectrum, and the increasing demand for data transmission capacity, there is increasing interest in offloading at least some communication traffic, such as downlink communication traffic, to the unlicensed spectrum. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary.

Before a base station can access unlicensed spectrum to transmit on an unlicensed spectrum bandwidth part (BWP) or component carrier (CC), which may be a wideband BWP or CC that include multiple sub-bands, the base station performs a listen-before talk (LBT) operation (for example including initial clear channel assessment (CCA) and an extended clear channel assessment (ECCA)) in order to check that the frequency resource of the BWP or CC is idle before transmitting. For example, if the BWP or CC is a wideband BWP or CC that include multiple sub-bands, the base station may perform a separate sub-band LBT procedure for each of the sub-bands to determine which of the sub-bands within the BWP or CC are idle/available for transmission.

In regions such as Europe and Japan, devices attempting to access the unlicensed spectrum have to comply with either a Load Based Equipment (LBE) LBT procedure or a Frame Based Equipment (FBE) LBT procedure.

In the LBE LBT procedure, a device attempting to access the unlicensed spectrum can start transmitting at an arbitrary time after a successful CCA. The CCA mechanism employed in such LBE LBT procedures may follow the same CCA mechanism employed in WLAN as part of the carrier sense multiple access with collision avoidance (CSMA/CA) scheme, or it may be an energy-detection-based CCA with random backoff generated from an adaptive contention window size. The channel access priority class is used to determine the contention window size and the respective maximum channel occupancy time (MCOT)

which determines the maximum amount of time that a device may transmit in the unlicensed spectrum once it has successfully contended for a transmission opportunity.

In FBE LBT procedures, a device attempting to access the unlicensed spectrum can start transmitting only at periodic instants after a short successful energy-detection-based CCA. For example, in the LBT procedure set out in European Telecommunications Standards Institute (ETSI) EN 301 893 V1.7.1 for devices accessing unlicensed spectrum as FBE, the minimum time between such periodic instants is a fixed frame period, which encompasses a channel occupancy time of the transmission and an idle period. Under the regulatory requirements set out in ETSI EN 301 893 V1.7.1, the channel occupancy time may be between 1 and 10 milliseconds (ms) and the idle period must be at least 5% of the channel occupancy time, which means that the frame period must be a minimum of 1.05 times the size of the channel occupancy time. Under the regulatory requirements set out in ETSI EN 301 893 V1.7.1, the CCA period must be at least 20 microseconds (μs) long, with 25 μs being typical.

For both LBE and FBE, under the regulatory requirements set out in ETSI EN 301 893 V1.7.1, devices employ an energy-detection-based CCA in which a channel is determined to be busy if the total energy detected in the channel is greater than a CCA threshold value that is upper bounded by a function of the transmit power of the device. In particular, the upper bound of the CCA threshold has been regulated as follows in the 5 GHz band:

$$CCA\ Threshold \geq -73 \frac{dBm}{MHz} + (23 - \max Tx\ EIRP)\ [dBm],$$

where max Tx EIRP is a device's maximum transmit equivalent isotropically radiated power (EIRP). As a result, the higher the max Tx power and/or the antenna gain, the lower the CCA threshold that is allowed. As such, an unlicensed spectrum access opportunity may depend on the result of the transmit power control mechanism that is used for unlicensed spectrum transmission. As noted above, in 5G NR one or more sub-bands of a larger wideband BWP or CC may be unavailable for a given transmission opportunity due to dynamic narrow band interference, and decoding performance for downlink transmissions and retransmissions on a wideband BWP or CC may be improved in an ED if the ED is aware of the acquired bandwidths within a given wideband BWP or CC. However, as also noted above, in 5G NR-U, there will likely be no cell-specific reference signal on the corresponding CC (e.g., the Cell-specific Reference Signal used in LTE LAA) transmitted to provide detection of CC/BWP existence in the downlink; therefore, the solution used in LTE LAA to indicate acquired bandwidths will likely not be suitable for 5G NR-U. Furthermore, due to the timing requirements associated with having to immediately transmit after a successful LBT procedure in order to comply with regulatory requirements, the solution used in IEEE 802.11ac/ax is also likely not suitable for 5G NR-U because practical hardware limitations prevent changing the PDCCH and PDSCH immediately after the LBT. In addition, the resource allocation TB/CB in 5G NR-U will likely be across sub-band LBT boundaries, which means that the decoding performance may be degraded if an ED does not have knowledge of the exact bandwidth the transmission occupied.

Bandwidth Indication for Wideband BWP/CC in Unlicensed Spectrum

Methods and devices are provided that address the above challenges associated with wideband downlink transmission in the unlicensed spectrum for 5G NR-U. In some embodiments, EDs are configured to monitor a PDCCH on multiple configured CORESETs in the frequency domain and on multiple time units during a monitoring window within a monitoring period. A time unit can be a transmission time intervals (TTI), a mini-slot, a slot, a sub-frame, a symbol, etc., in different embodiments. The bandwidth of each CORESET may be limited within the bandwidth of a sub-band LBT, for example 20 MHz. The base station transmits downlink control information (DCI) in one or more of the configured CORESETs, the DCI carrying information indicating the exact acquired transmission bandwidth of a wideband CC or activated BWP(s) in unlicensed spectrum. The DCI may also include information indicating a period of time associated with the indicated bandwidth. For example, in some embodiments the DCI may also include information indicating the number of time units before and/or after the current time units carrying DCI in the current channel occupancy time (COT). In general, the DCI are not required to be transmitted in the first time unit of the channel occupancy time, but is instead transmitted in a later time unit in order to provide time to update the PDCCH/PDSCH, e.g., based on the outcome of the sub-band LBT operations in each of the sub-bands of the wideband BWP or CC. In some embodiments, the bandwidth indication is carried in group common PDCCH, which may save control signaling overhead relative to embodiments in which the bandwidth indication is carried in UE-specific PDCCH. In the present disclosure, the DCI carrying a bandwidth indication is referred to as bandwidth indication DCI (BWI-DCI). In some embodiments, the bandwidth indication information is carried together with other information, e.g., slot format information, in one DCI, rather than in a separate DCI dedicated to bandwidth indication.

An ED, such as a UE, detects BWI-DCI in one or more of the CORESETs that the ED has been configured to monitor within the monitoring window, and performs decoding using the bandwidth indication provided in the BWI-DCI. For example, the ED may dump the log-likelihood ratio (LLR) corresponding to a resource element (RE) on which no transmission is indicated in the BWI-DCI if the associated TB has not been correctly received, i.e., similar to a pre-emption indication. Similarly, an ED may not include REs outside of the indicated bandwidth if a downlink transmission is scheduled for the ED in time units following the time unit carrying the BWI-DCI.

The acquired bandwidth indication provided by embodiments of the present disclosure can potentially help improve decoding performance in EDs for both initial and re-transmission when sub-band interference occurs. Moreover, the acquired bandwidth indication in BWI-DCI does not require immediate PDCCH/PDSCH updates after LBT, and thus accommodates practical hardware limitations.

Figure 2:
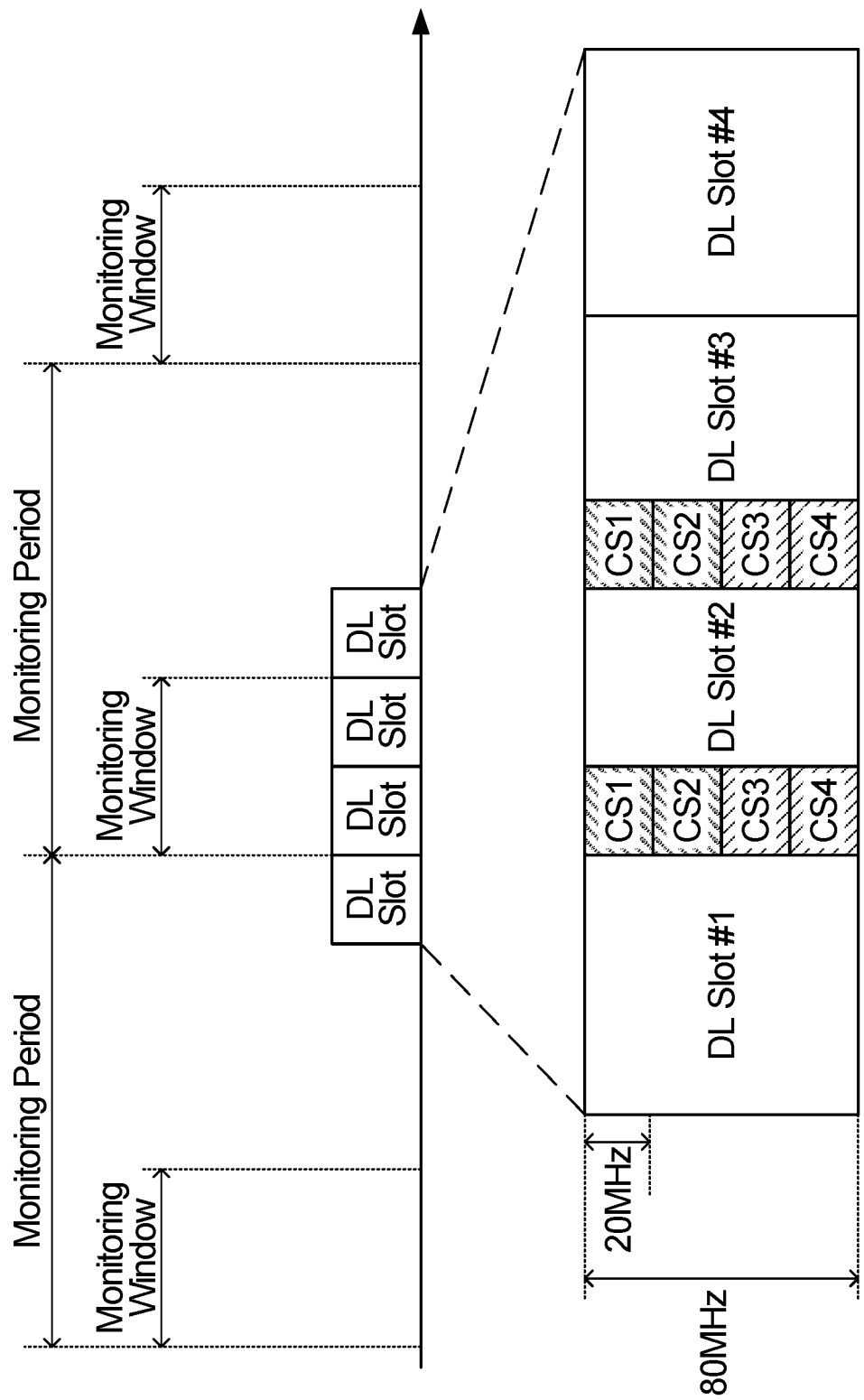
FIG. 2 is a time-frequency diagram showing an example of the transmission of downlink control information (DCI) in one or more of four configured control resource sets (CORESETs) for a physical downlink channel (PDCCH), wherein the four configured CORESETs are configured in an unlicensed spectrum bandwidth part (BWP) and the DCI carry acquired bandwidth indication(s) for the unlicensed spectrum BWP in accordance with a first embodiment of the present disclosure.

FIG. 2 is a time-frequency diagram showing an example of the transmission of group common PDCCH carrying BWI-DCI in one or more of four configured CORESETs, wherein the four configured CORESETs are configured in an unlicensed spectrum BWP and the BWI-DCI carries acquired bandwidth indication(s) for the unlicensed spectrum BWP or CC in accordance with a first embodiment of the present disclosure.

In the example shown in FIG. 2, the unlicensed spectrum BWP is a single wideband active BWP with a bandwidth of 80 MHz that includes four 20 MHz sub-bands, each corresponding to one of the four configured CORESETs. As shown in FIG. 2, the BWI-DCI carrying BW indication occurs in the CORESET within the monitoring window of a current monitoring period of group common PDCCH. The base station may transmit BWI-DCI carrying the bandwidth indication on one or more of the four CORESETs. By configuring ED with multiple CORESETs in the frequency domain, an ED monitoring the multiple CORESETs may still be able to receive the BWI-DCI carrying the bandwidth indication as long as the BWI-DCI is transmitted on at least one of the CORESETs, e.g., as long as a sub-band LBT procedure for at least one of the 20 MHz sub-bands indicates the sub-band is idle/available and the base station is able to transmit the BWI-DCI on the available sub-band(s). Two types of LBT have been defined for multiple channel access in unlicensed spectrum, namely Type A and Type B. In LBT Type A, a sub-band LBT procedure, e.g., CSMA/CA, is performed on each of the channels/sub-bands. In this case, the BWI-DCI can be transmitted on any channel that is sensed as being idle/available. In LBT type B, a device seeking to access unlicensed spectrum performs a hierarchal LBT, i.e., the device may first listen on the frequency region of a 'primary' sub-band, e.g., sub-band 1, to determine whether the channel is idle. If the device determines the channel is idle on the primary sub-band, then the device checks the channel on each of the other sub-bands, i.e., the other three sub-bands in FIG. 2, whether the sub-band is idle within the past short period of time, e.g., 25 µs. If the device determines that one or more other sub-bands is also idle, then the device may acquire not just the resources on the primary sub-band, but also the resources on one or more other idle sub-bands and perform a wider band transmission in unlicensed spectrum. In some embodiments, even if multiple sub-bands within the BWP are available, the base station may choose to only transmit the BWI-DCI on the CORESET located in a primary 20 MHz LBT bandwidth (e.g., the 20 MHz bandwidth in which BWI1 is shown as being transmitted in FIG. 2) if LBT Type B channel access is used.

In the example shown in FIG. 2, the monitoring window has a duration equal to two time units (slots in this example). As shown in FIG. 2, in some embodiments the BWI-DCI may be transmitted by the base station in more than one of the time units within the monitoring window, e.g. FIG. 2 shows that BWI-DCI is transmitted in DL Slot #2 and DL Slot #3 within the monitoring window of the current monitoring period.

As noted above, in some embodiments the BWI-DCI may include information indicating a period of time associated with the indicated bandwidth. For example, the BWI-DCI transmitted in DL Slot #2 may include information indicating the available bandwidth (e.g., information indicating all four 20 MHz sub-bands of the 80 MHz BWP are available), as well as information indicating the number of time units with the bandwidth before the BWI-DCI (e.g., 1), and the number of time units with the bandwidth after the BWI-DCI (e.g., 3). Alternatively, the BWI-DCI may indicate the number of time units of the rest of the transmission burst after BWI-DCI, including the time units carrying the BWI-DCI and time units within the transmission burst after the time unit carrying the BWI-DCI. In some cases, the duration of the rest of the transmission burst can be obtained through other DCI (e.g. DCI carrying slot format information) and no explicit signaling for the duration of the rest of the transmission burst is provided in the BWI-DCI.

As discussed previously, due to hardware limitations the base station avoids transmission of the BWI-DCI carrying the bandwidth indication in the first time unit immediately following the LBT. For example, in FIG. 2 the LBT for the current COT concludes immediately before the beginning of the current monitoring period, which begins with the monitoring window. For this reason, the base station does not transmit the BWI-DCI carrying the bandwidth indication in DL Slot #1, because that is the first time unit following the LBT procedure, which includes four sub-band LBT procedures as discussed previously.

Figure 3:
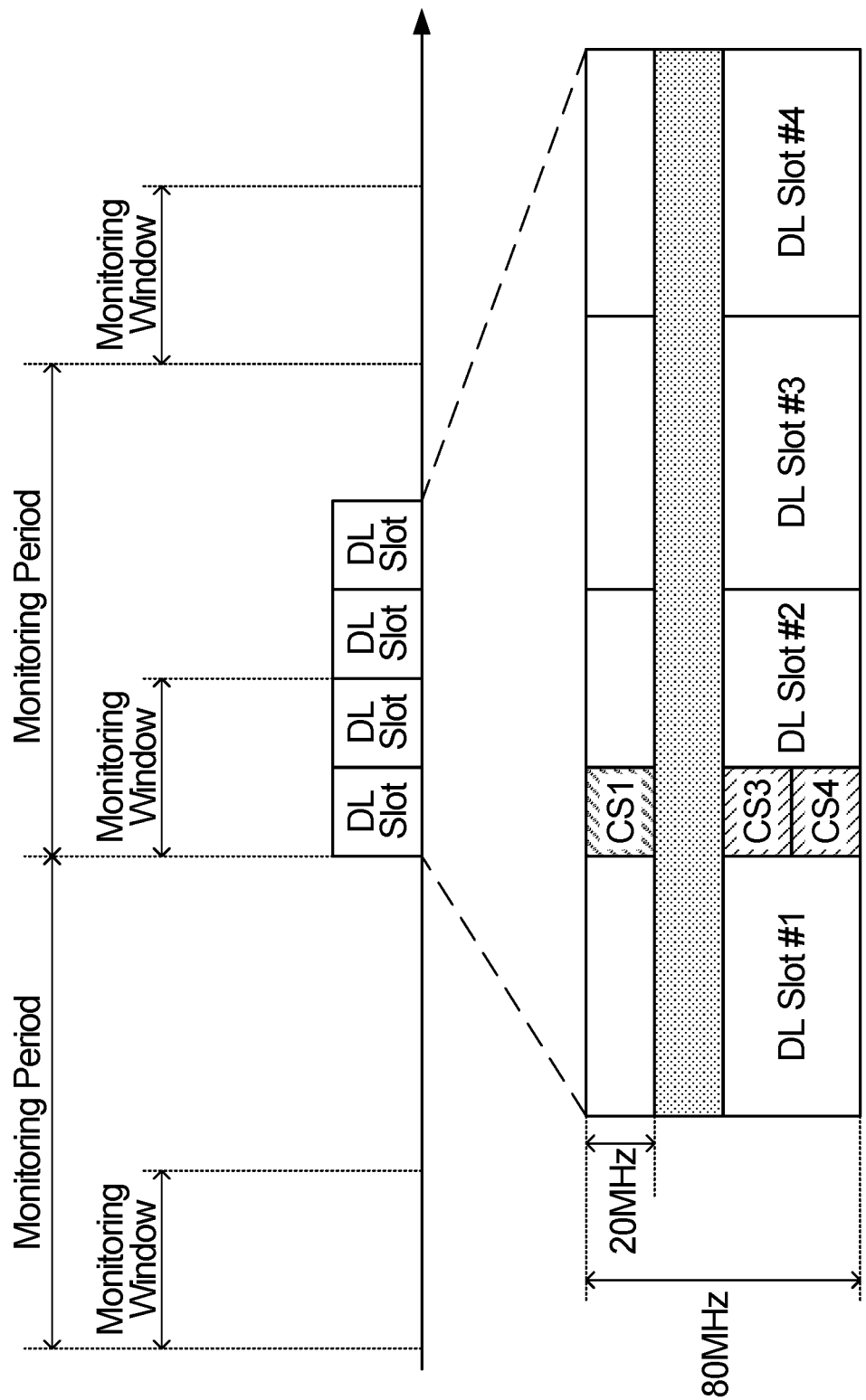
FIG. 3 is a time-frequency diagram showing another example of the transmission of DCI carrying acquired bandwidth indication(s) for an unlicensed spectrum BWP in one or more of four configured CORESETs for a PDCCH in accordance with the first embodiment of the present disclosure.

FIG. 3 is a time-frequency diagram showing another example of the transmission of BWI-DCI carrying acquired bandwidth indication(s) for an unlicensed spectrum BWP in which one of the 20 MHz sub-band LBTs has failed or something else has occurred that has caused one of the 20 MHz sub-bands within an 80 MHz unlicensed spectrum BWP to be non-acquired.

When LBT fails in one or more sub-bands of the 80 MHz BWP, the base station indicates the exact BW acquired for transmission, or may instead indicate which bandwidth(s) are punctured or non-acquired within the BWP, in the BWI-DCI transmitted within the monitoring window. In FIG. 3, the punctured bandwidth is the second 20 Mhz sub-band from the top of the 80 MHz BWP. In this example, for the DL transmission in slot #1, a receiving ED may dump the LLR on the punctured resource when performing HARQ combining with a retransmission. The ED may also attempt to re-decode the received DL transmission in slot #1 after dumping the LLR on the punctured resource and before sending the HARQ feedback to the base station, or before the base station performs the retransmission. For the DL transmissions in Slots #2, #3 and #4, a receiving ED may not include the LLR on the punctured resource in the decoding procedure.

In some embodiments, the BW indication in BWI-DCI is a bit map indicating which LBT BW has been acquired. For example, in this example the bit map may be "1011" indicating that the second LBT BW has not been acquired. Alternatively, the BW indication in BWI-DCI may be an index value of an index corresponding to each combination of acquired/non-acquired LBT BWs.

Figure 4:
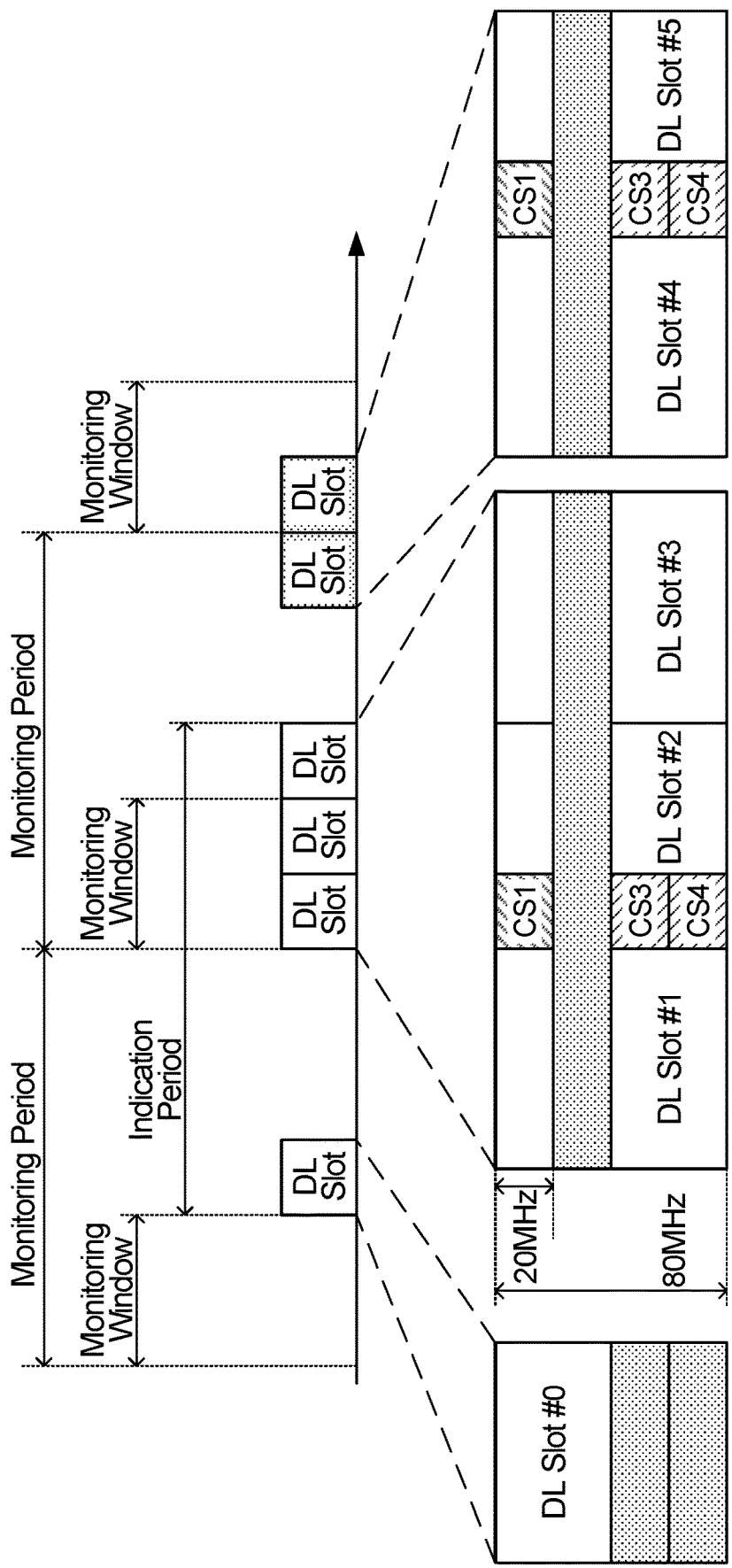
FIG. 4 is a time-frequency diagram showing an example of the transmission of DCI carrying acquired bandwidth indication(s) for an unlicensed spectrum BWP in one or more of four configured CORESETs for a PDCCH in accordance with a second embodiment of the present disclosure.

FIG. 4 is a time-frequency diagram showing an example of the transmission of BWI-DCI carrying acquired bandwidth indication(s) for an unlicensed spectrum BWP in one or more of four configured CORESETs for a group-common PDCCH in accordance with a second embodiment of the present disclosure in which the BWI-DCI transmitted within the monitoring window of a current monitoring period indicates the bandwidth of burst(s) initiated after the end of the monitoring window in the preceding monitoring period until the end of the DL burst in which the BWI-DCI is transmitted. This time span defines the "Indication Period". In this case, the BWI-DCI can be considered a cross channel occupancy time (COT) bandwidth indication because it potentially indicates bandwidths for more than one COT.

For example, the BWI-DCI transmitted in the CORESET 1 in DL Slot #2 in FIG. 4 may indicate the bandwidth of DL Slot #0 in the preceding monitoring period and the bandwidth of DL Slots #1, #2 and #3 in the current monitoring period. It is noted that DL Slot #3 is part of the same COT in which the GC-DCI is transmitted and wherein the acquired BW is a result of the LBT procedure that preceded the transmission of DL Slot #1. Similarly, in the subsequent monitoring period the BWI-DCI transmitted in DL Slot #5 may indicate the bandwidth of DL Slot #4 and DL Slot #5. In another variation of this example (not shown in FIG. 4), DL Slot #3 is transmitted after the end of the monitoring window in which the BWI-DCI is transmitted yet in a separate COT from the COT containing the BWI-DCI and the separate COT is preceded by an independent LBT procedure. Therefore, in that variation of this example, the BWI-DCI transmitted in DL Slot #5 may indicate the bandwidth of DL Slots #3 and #4 in the preceding monitoring period and the bandwidth of DL Slots #5.

Figure 5:
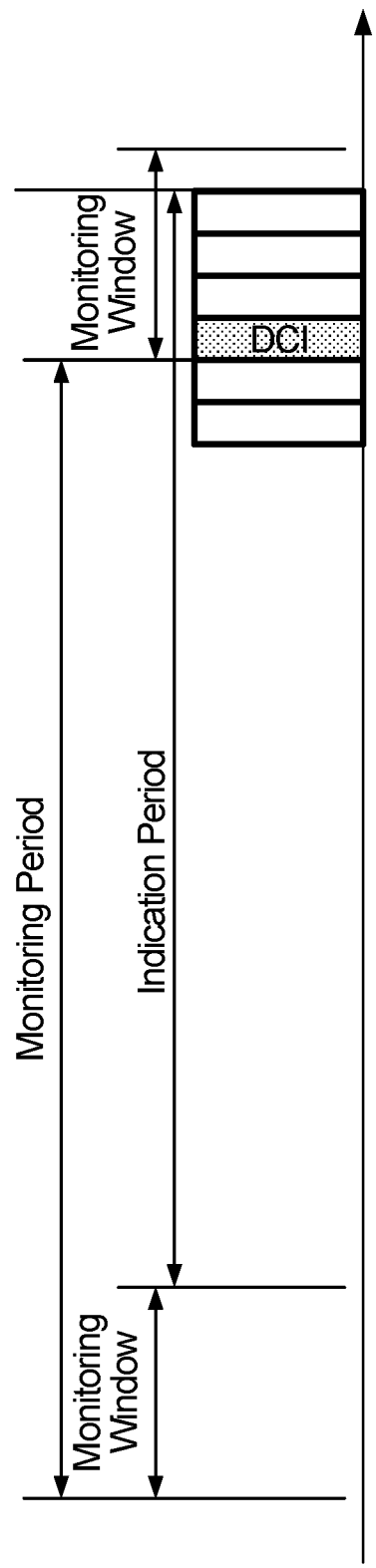
FIG. 5 is a time-frequency diagram showing an example of the transmission of DCI carrying an acquired bandwidth indication for a single downlink transmission burst in an unlicensed spectrum BWP in accordance with a third embodiment of the present disclosure.

FIG. 5 is a time-frequency diagram showing an example of the transmission of BWI-DCI carrying a acquired bandwidth indication for a single downlink transmission burst in an unlicensed spectrum BWP in accordance with a third embodiment of the present disclosure in which the BWI-DCI includes at least the following two parts: information indicating a time period and information indicating a bandwidth corresponding to the time period. As noted previously, the bandwidth information can be transmitted using a bit map to indicate which sub-band(s) is/are not acquired. E.g. a 4-bit bitmap may be used to indicate four 20 MHz sub-bands for a 80 MHz BWP/CC. Alternatively, if the BW variation is limited, each variation can be indexed and the appropriate index value can be transmitted. In some embodiments, an ED can validate the received BW indication against invalid BW combinations; at least the 'all-failed' combination, e.g., a "0000" bit map, if no limitations exist on BW variation. Otherwise, the base station may reserve such invalid BW combinations to signal other special commands to the ED.

In some embodiments, the time period of indication (Indication Period) is further divided into two parts, e.g., a time period before the time unit(s) in which the BWI-DCI is transmitted and a time period duration of the rest of the transmission burst including the time unit(s) in which the BWI-DCI is transmitted. For example, in FIG. 5 the time period indication in the BWI-DCI transmitted within the first time unit of the monitoring window would indicate 2 time units before time units carrying BWI-DCI and 4 time units in the rest of the burst including that carrying BWI-DCI. If a 60 KHz sub-carrier spacing (SCS) is used with a 0.25 ms slot duration, and a maximum 8 ms MCOT, it can be shown that a maximum of 5 bits is needed to indicate the number of slots before BWI-DCI and a maximum of 5 bits is needed to indicate the number of slots after BWI-DCI. For example, the unit of indication of time duration can be subframe, slot, mini-slot, or OFDM symbol(s), as discussed previously.

The size of the bit field to carry the time period indication can be indicated by higher-layer signaling, such as radio resource control (RRC) signaling and/or calculated based on the numerology configured for an ED's BWP. In some embodiments, an ED can validate the received pair of time period indications by checking whether the sum of the two time periods is less than or equal to the MCOT corresponding to a priority class of the DL burst. In some embodiments, invalid time period indications such as a bit map or index value that would otherwise indicate '0-slots before BWI-DCI' can be reserved/used to signal other special commands to the ED.

Figure 6:
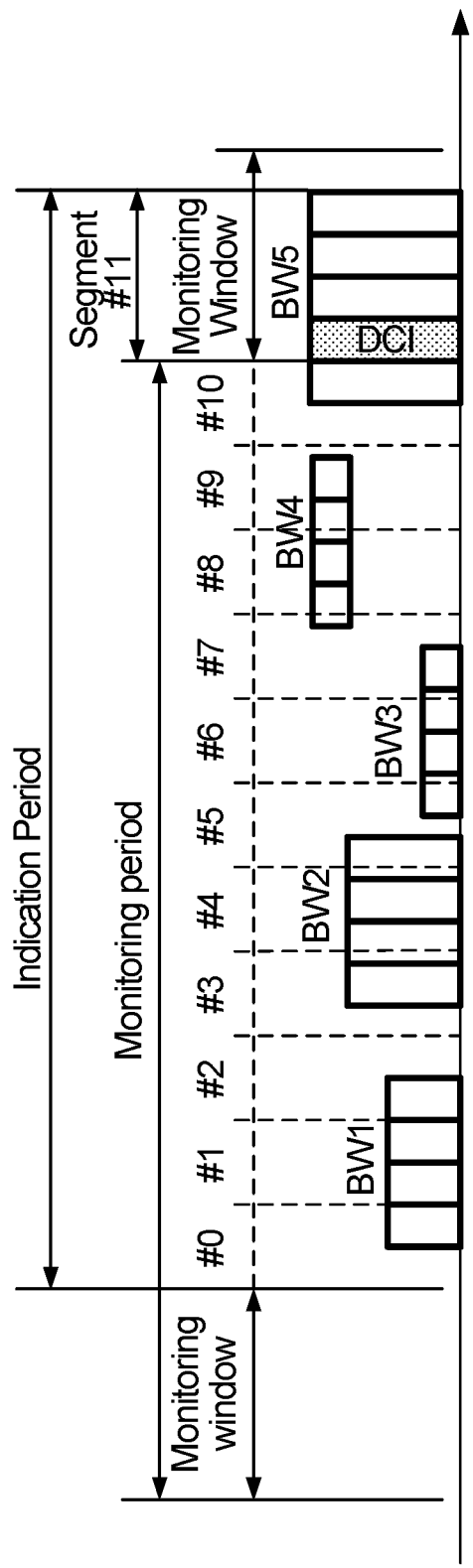
FIG. 6 is a time-frequency diagram showing an example of the transmission of DCI carrying acquired bandwidth indications for multiple downlink transmission burst in an unlicensed spectrum BWP in accordance with a fourth embodiment of the present disclosure.

FIG. 6 is a time-frequency diagram showing an example of the transmission of BWI-DCI carrying acquired bandwidth indications for multiple downlink transmission bursts in an unlicensed spectrum BWP in accordance with a fourth embodiment of the present disclosure in which a time period between the end of a preceding monitoring window and the beginning of a time units in which the BWI-DCI is transmitted within the current monitoring window is divided into N segments of time, N≥1, and the bandwidth information in the BWI-DCI transmitted within the monitoring window of a current monitoring period indicates a respective bandwidth for each of the N segments. In the example shown in FIG. 6, the time period before the BWI-DCI has been divided into 11 segments, i.e. N=11. In this example, the remaining portion of the Indication Period from the transmission of the BWI-DCI until the end of the indication period is represented as an additional segment, i.e., segment #11, which as shown in this example may not be of the same length as the segments before the BWI-DCI. The number of segments can be fixed or configured by RRC signaling. As shown in FIG. 6, the segment boundaries may not be aligned with the starting and ending times of the transmissions, and therefore a given segment may include more than one transmission burst. The acquired bandwidth of each segment is the union acquired bandwidth of transmission bursts in the segment. For example, in this example:

the bandwidth indication field corresponding to segment #1 in the BWI-DCI should indicate BW1 the bandwidth indication field corresponding to segment #3 in the BWI-DCI should indicate BW2 the bandwidth indication field corresponding to segment #5 in the BWI-DCI should indicate BW2;

the bandwidth indication field corresponding to segment #7 in the BWI-DCI should indicate BW2 ∪ BW4; and the bandwidth indication field corresponding to segment #11 in the BWI-DCI should indicate BW5.

Alternatively, the BWI-DCI may indicate the minimum bandwidth covering all the bandwidth of the transmission burst. For example, this approach may be used when the BW indication in BWI-DCI is in the form of a predefined index of BW combinations or a bit map, as discussed previously.

Figure 7:
FIG. 7 is a time-frequency diagram showing an example of the transmission of multiple downlink bursts containing DCI carrying a bandwidth indication within a monitoring window in accordance with a fifth embodiment of the present disclosure.

It is noted that the indication period for a given BWI-DCI is specific to the DL burst in which the BWI-DCI is transmitted. Since a BWI-DCI may target a specific UE or a specific UE group, multiple DL bursts containing BWI-DCI may occur within a monitoring window. In this case, the indication periods of such DL bursts may overlap, i.e., the BWIs for the time period before the BWI-DCI of the DL burst with the latest ending time point may encompass all the BWIs in the BWI-DCI of a DL burst with an earlier ending time point. An example of this is shown in FIG. 7, which is a time-frequency diagram showing an example of the transmission of BWI-DCI in accordance with a third embodiment of the present disclosure in which multiple DL bursts containing BWI-DCI are transmitted within a monitoring window. In this example, it can be seen that the indication period for a $1^{st}$ BWI-DCI overlaps with the indication period for a $2^{nd}$ BWI-DCI, where both the $1^{st}$ BWI-DCI and the $2^{nd}$ BWI-DCI are transmitted via $1^{st}$ and $2^{nd}$ DL bursts, respectively, within the same monitoring window.

Figure 8A:
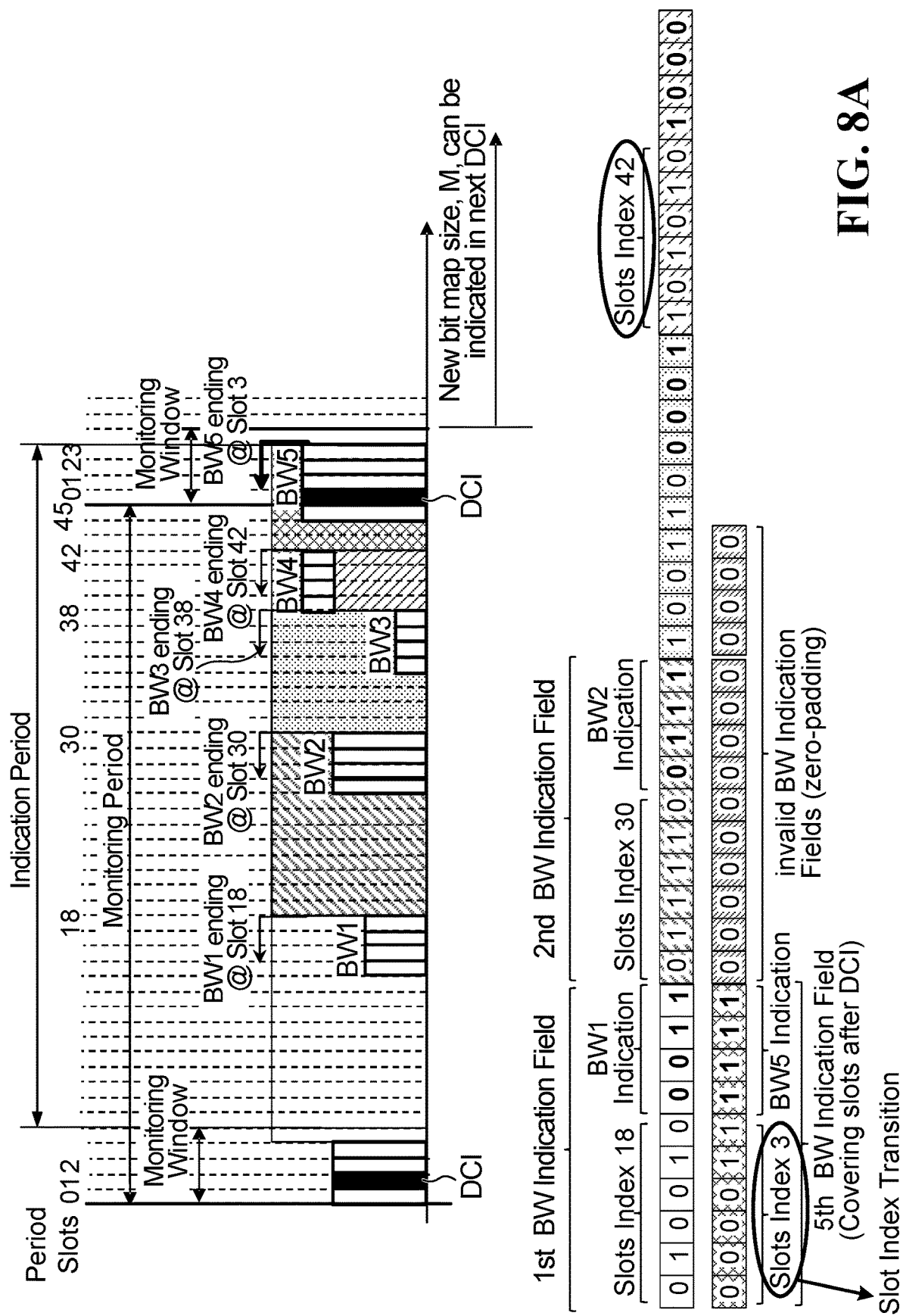
FIG. 8A is a time-frequency diagram showing an example of the transmission of DCI carrying acquired bandwidth indications for multiple downlink transmission burst in an unlicensed spectrum BWP in accordance with a sixth embodiment of the present disclosure.
Figure 8B:
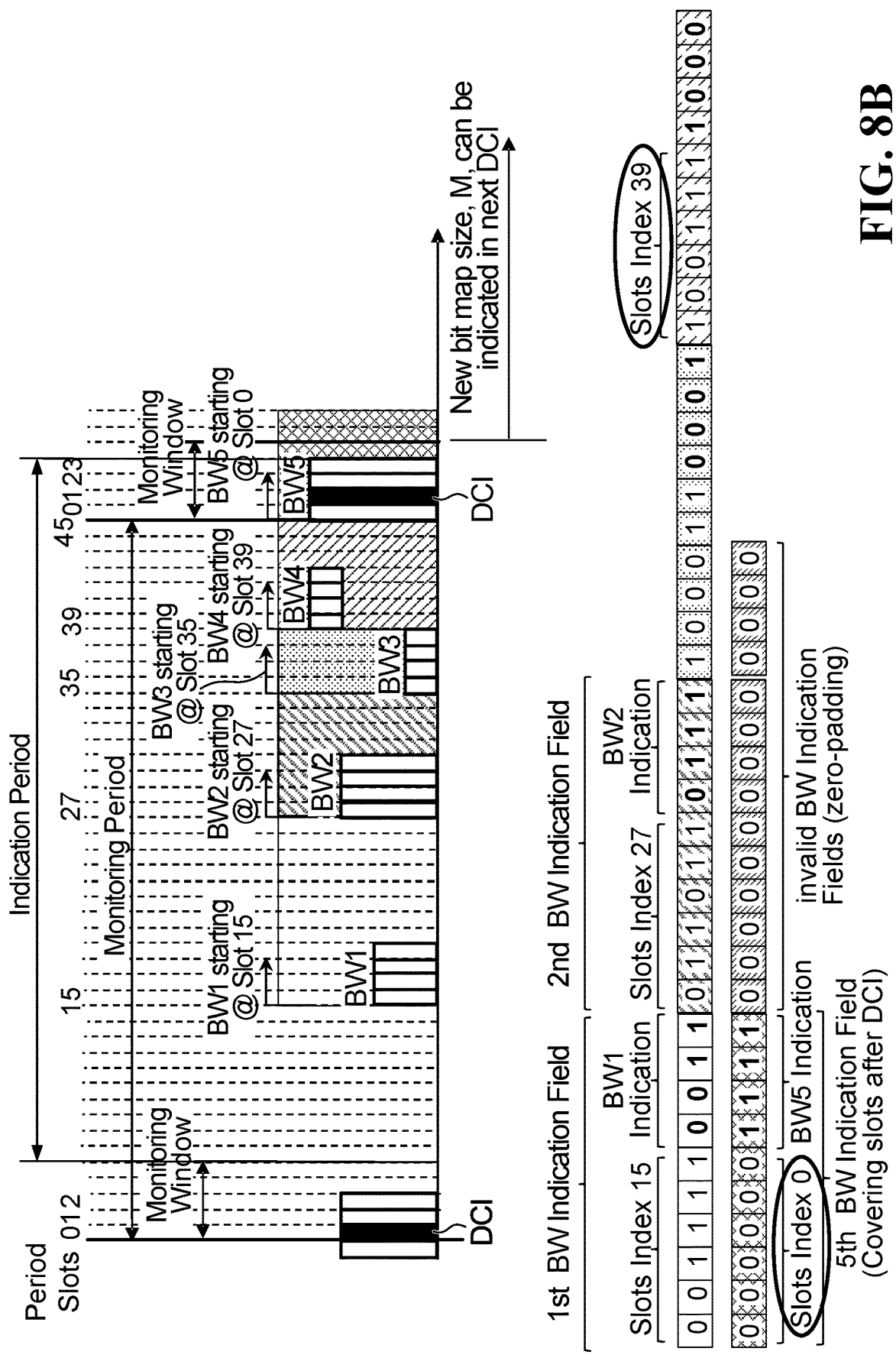
FIG. 8B is a time-frequency diagram showing another example of the transmission of DCI carrying acquired bandwidth indications for multiple downlink transmission burst in an unlicensed spectrum BWP in accordance with the sixth embodiment of the present disclosure.

FIGS. 8A and 8B are time-frequency diagrams showing two examples of the transmission of BWI-DCI carrying a acquired bandwidth indication for multiple downlink transmission bursts in an unlicensed spectrum BWP in accordance with a fifth embodiment of the present disclosure in which the monitoring period is defined in terms of a number P of time units and downlink transmission bursts transmitted by the base station have ending and starting points that are aligned to the time unit boundaries, respectively. For example, using a larger SCS, e.g., 60 KHz, may make it feasible to align the starting and/or ending points of bursts to the time unit slot boundaries. In this scenario, the overlap of bursts having different acquired transmission bandwidths on the same segment/slot is avoided and the bandwidth indication information can potentially be simplified. It is noted that, although the DL bursts depicted in the diagram of FIG. 8A are shown to have both the starting and ending points aligned to the time unit boundaries, the starting points need not be aligned to the time unit boundaries for proper operation of the BW indication mechanism depicted therein. Similarly, although the DL bursts depicted in the diagram of FIG. 8B are shown to have both the starting and ending points aligned to the time unit boundaries, the ending points need not be aligned to the time unit boundaries for proper operation of the BW indication mechanism depicted therein.

In accordance with this embodiment, the base station can configure the ED with the monitoring period in terms of the number of slots (i.e, P slots). Hence, at least p bits can be used, for instance, to indicate the index of any given slot within the configured monitoring period such that $p=\text{ceil}(\log_2 P)$. It should be noted though that time units within the monitoring period may be indexed relative to the beginning of each monitoring period to reduce the signaling overhead compared to indicating the absolute time unit indexes.

To reduce the complexity and energy consumption of blind detection of the GC-DCI format at the ED, a fixed size can be adopted for the bandwidth indication fields, e.g., X bits can be adopted as the total size of the bandwidth indication fields. The bit map size used for each bandwidth indication, M, can be pre-configured through RRC signaling and/or can be indicated as part of the GC-DCI using a separate 'LBT BW Resolution' field of fixed length (e.g., 011 means M=4 bits (sub-bands) and 111 means M=8 bits (sub-bands), whereas 000 means single wideband LBT across the whole BWP). In one embodiment, the LBT BW Resolution field may indicate the bit map size, M, associated with the bandwidth indication fields contained in the same GC-DCI. In another embodiment, the LBT BW Resolution field may indicate the bit map size, M, associated with the bandwidth indication fields that will be contained in the following GC-DCI; in such case, the group EDs had been RRC-configured with the initial bit map size before the first GC-DCI was transmitted. Signaling the LBT BW Resolution (or the bit map size) associated with the bandwidth indication fields that will be contained in the following GC-DCI may also be used to indicate the 'UL LBT BW Resolution,' i.e., the maximum number of UL sub-bands for the group EDs to perform sub-band LBTs before transmitting the respective UL bursts on the UL BWP within the following monitoring window. This may also allow the base station to allocate the resources accordingly for the PUSCH and PUCCH transmissions scheduled within the following monitoring window for the group EDs.

Based on p, the associated M, and the fixed size X, the maximum number of bandwidth indication fields (bursts) can be determined as follows such that each bandwidth indication field comprises M bandwidth indication bits and p bits indicating either the ending_slot_index (see FIG. 7A) or the starting_slot_index (see FIG. 8B) of the respective BW indication.

Accordingly, in the examples shown in FIGS. 8A and 8B, the GC-DCI includes an integer number X of bits for carrying the bandwidth indication and corresponding time period indication for each of a plurality of acquired transmission bandwidths. The X bits include an integer number $N_{BW\_ind\_fields}$ of bandwidth indication fields, each bandwidth indication field comprising an integer number M of indication bits indicating an acquired bandwidth and an integer number p of indication bits indicating a time unit index of an associated time unit. In these embodiments, the number $N_{BW\_ind\_fields}$ of bandwidth indication fields satisfies the following equation:

$$N_{BW\_ind\_fields} = \text{floor}(X/(M+p)), \text{ where floor}(.) \text{ is the floor function.}$$

More specifically, in the examples shown in FIGS. 8A and 8B, P=46 slots, which means that p=6 bits, while the associated bit map size has been indicated as M=4 bits, which means that each bandwidth indication field is 10 bits long. If X in the GC-DCI is fixed to 64 bits, then $N_{BW\_ind\_fields}=6$. However, in these examples there are only five bandwidths to be indicated for the current monitoring period, namely BW1, BW2, BW3, BW4 and BW5, and therefore the sixth 10-bit bandwidth indication field and the 4-bit remainder of the 64 bits of X are padded with zeros.

Since an 'all-failed' BW indication or ending_slot_index=0 are invalid, an ED can determine whether a valid BW indication field exists or the zero-padded portion of the X bits has been reached without prior knowledge of the actual number of bandwidth indications being indicated. In some other implementations than depicted in FIGS. 8A and 8B, the order of the M bandwidth indication bits and p bits may be swapped for faster detection of invalid/zero-padded fields.

In some embodiments, an ED can recognize which BW indication (burst) is relevant to its PDSCH by comparing the PDSCH ending time slot or starting time slot to the ones indicated in the GC-DCI. For instance, in the example depicted in FIG. 8A, a group ED which only received PDSCHs in Slots #28 to #29 and then Slot #40, may use only the bandwidth indications of the $2^{nd}$ and $4^{th}$ bandwidth indication fields, respectively, which are contained in the subsequent GC-DCI. This is because the ED, upon receiving the GC-DCI, determines that the least indicated ending_slot_index that is greater than or equal to the PDSCH ending Slot #29 is index 30 corresponding to the $2^{nd}$ bandwidth indication; whereas the least indicated ending_slot_index that is greater than or equal to the PDSCH ending Slot #40 is index 42 corresponding to the $4^{th}$ bandwidth indication. Similarly, in the example depicted in FIG. 8B, a group ED which only received PDSCHs in Slots #28 to #29 and then Slot #40, may use only the bandwidth indications of the $2^{nd}$ and $4^{th}$ bandwidth indication fields, respectively, which are contained in the subsequent GC-DCI. This is because the ED, upon receiving the GC-DCI, determines that the greatest indicated starting_slot_index that is less than or equal to the PDSCH starting Slot #28 is index 27 corresponding to the $2^{nd}$ bandwidth indication; whereas the greatest indicated starting_slot_index that is less than or equal to the PDSCH starting Slot #40 is index 39 corresponding to the $4^{th}$ bandwidth indication.

As shown in the examples depicted in FIGS. 8A and 8B, in some embodiments UE can recognize the bandwidth indications for forthcoming slots of the burst containing the GC-DCI from the transition in the slot index values, i.e., slot index values referring to time units at the beginning of the monitoring period and/or smaller than the slot index of the previous bandwidth indication field in the same GC-DCI. For example, the p indication bits in the fourth bandwidth indication field corresponding to BW4 of FIG. 8A indicate ending_slot_index=42 while the next p indication bits in the fifth bandwidth indication field corresponding to BW5 indicate ending_slot_index=3 and thus are associated with time units after the time unit in which the GC-DCI is transmitted, i.e., time units corresponding to time unit indexes 1-3 of the subsequent monitoring period as well as time unit 45 of the current monitoring period. Similarly, the p indication bits in the fourth bandwidth indication field corresponding to BW4 of FIG. 8B indicate starting_slot_index=39 while the next p indication bits in the fifth bandwidth indication field corresponding to BW5 indicate starting_slot_index=0 and thus are associated with time units after the time unit in which the GC-DCI is transmitted, i.e., time units corresponding to time unit indexes 0-3 of the subsequent monitoring. It is noted that in the example of FIG. 8B, a group ED recognizes the fifth bandwidth indication field as a valid field, i.e., not void or zero-padded, despite the base station setting the respective p bits to zeros since the remaining M bits of that field cannot indicate an all-zero bit map.

Figure 9:
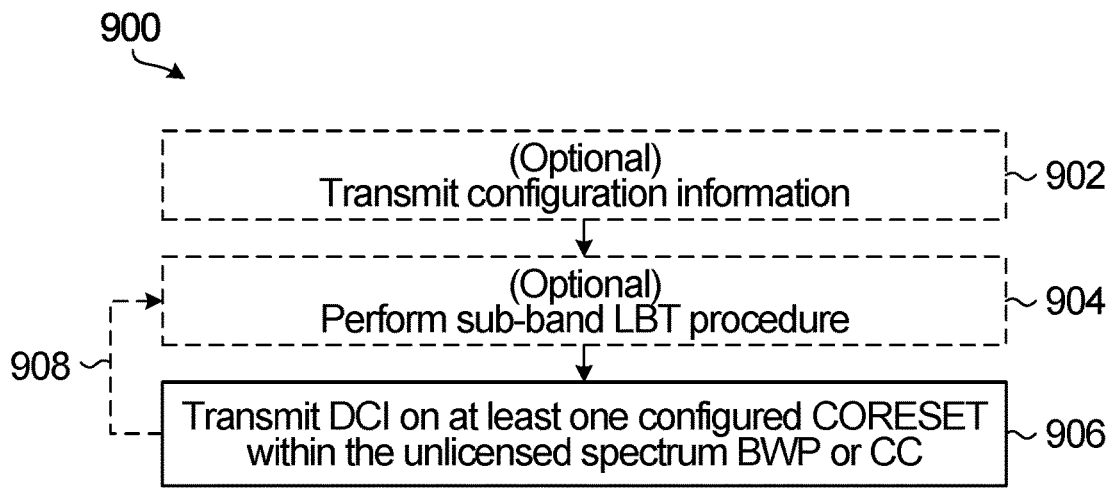
FIG. 9 is a flow diagram of example operations in a base station in accordance with an embodiment of the present disclosure.

FIG. 9 is a flow diagram of examples operations 900 in a base to indicate downlink bandwidth for unlicensed spectrum in accordance with an embodiment of the present disclosure.

Optionally, in block 902, the base station transmits configuration information to configure EDs to periodically monitor for BWI-DCI on each of a plurality of configured CORESETs within an unlicensed spectrum BWP or CC. Each configured CORESET of the plurality of configured CORESETs corresponds to a respective frequency domain and/or time domain search space within the unlicensed spectrum BWP or CC. The configuration information may be transmitted through RRC signaling, for example.

Optionally, in block 904, the base station performs an LBT procedure to acquire one or more sub-bands of the unlicensed spectrum BWP or CC. This may involve, for example, performing a Type A or Type B sub-band LBT procedure for the sub-bands with the unlicensed spectrum BWP or CC.

In block 906, the base station transmits BWI-DCI on at least one of the configured CORESETs configured within the unlicensed spectrum BWP or CC, the BWI-DCI being transmitted within a configured monitoring window within a configured monitoring period in the time domain and including an acquired bandwidth indication for indicating at least one acquired bandwidth within the unlicensed spectrum BWP or CC.

The base station may then return to block 904 to perform the sub-band LBTs again for the next transmission opportunity in accordance with the configured monitoring period as indicated at 908.

The example operations 900 are illustrative of an example embodiment. Various ways to perform the illustrated operations, as well as examples of other operations that may be performed, are described herein. Further variations may be or become apparent.

For example, in some embodiments for each of the at least one bandwidth indicated, the acquired bandwidth indication corresponds to a period of time associated with the indicated bandwidth, the period of time being defined in terms of at least one of: a number of time units before a time unit in which the DCI is transmitted; a number of time units after the time unit in which the DCI is transmitted; a first time period before the time at which the DCI is transmitted; and a second time period after the time at which the DCI is transmitted.

In some embodiments, the acquired bandwidth indication indicates at least one acquired bandwidth for downlink transmission within the unlicensed spectrum BWP or CC, or the acquired bandwidth indication indicates at least one punctured bandwidth that is not used for transmission within the unlicensed spectrum BWP or CC.

In some embodiments, the acquired bandwidth indication indicates at least one acquired bandwidth for downlink transmission within the unlicensed spectrum BWP or CC, the downlink transmission being initiated by the base station within an indication period defined at or after the end of a preceding monitoring window and up to the end of a downlink transmission burst in which the DCI carrying the acquired bandwidth indication is transmitted.

In some embodiments, the indication period comprises a plurality of segments of time and the acquired bandwidth indication indicates a respective bandwidth for each segment of time.

In some embodiments, the indication period is defined in terms of a number of time units. In such embodiments, downlink transmission bursts transmitted by the base station may have starting and/or ending points that are aligned to boundaries of the time units. Furthermore, the bandwidth indication may indicate a starting time unit and/or an ending time unit of a time period associated with each of the at least one acquired bandwidth, wherein the starting time unit or the ending time unit of the time period aligns with the staring or ending point of the at least one downlink transmission burst, respectively.

In some embodiments, the DCI includes an integer number X of bits for carrying the information indicating at least one bandwidth within the unlicensed spectrum BWP or CC and the information that, for each indicated bandwidth indicates an associated period of time. The X bits may include an integer number $N_{BW\_ind\_fields}$ of bandwidth indication fields, each bandwidth indication field including an integer number M of indication bits indicating a bandwidth and an integer number p of indication bits indicating a time unit index of an associated time unit.

In some embodiments, the number $N_{BW\_ind\_fields}$ of bandwidth indication fields and the number p of indication bits indicating a time unit index satisfy the following equations: p=ceil($\log_2$ P), where ceil(.) is the ceiling function; and $N_{BW\_ind\_fields}$=floor(X/(M+p)), where floor( ) is the floor function.

In some embodiments, any remaining bits appending the $N_{BW\_ind\_fields}$ bandwidth indication fields in the X bits are set to zeros.

In some embodiments, for each of the $N_{BW\_ind\_fields}$ bandwidth indication fields, the time unit index indicated by the p indication bits of the bandwidth indication field indicates an ending time unit index of the time period associated with the bandwidth indicated by the M indication bits of the bandwidth indication field.

In some embodiments, for each of the $N_{BW\_ind\_fields}$ bandwidth indication fields, the time unit index indicated by the p indication bits of the bandwidth indication field indicates a starting time unit index of the time period associated with the bandwidth indicated by the M indication bits of the bandwidth indication field.

In some embodiments, the p indication bits in a bandwidth indication field associated with at least one time unit after the time unit in which the DCI is transmitted indicate a time unit index of an associated time unit in the next monitoring period.

In some embodiments, transmitting the DCI on at least one configured CORESET comprises for each configured CORESET on which the DCI is transmitted, transmitting the DCI within a time unit after the first time unit of a transmission burst following a successful LBT procedure in block 904 for a bandwidth corresponding to the respective frequency domain search space of the configured CORESET.

In some embodiments, the information indicating at least one bandwidth within the unlicensed spectrum BWP or CC comprises a bit map indicating which LBT bandwidth(s) are acquired for downlink transmission within the unlicensed spectrum BWP or CC.

In some embodiments, the information indicating at least one bandwidth within the unlicensed spectrum BWP or CC comprises an index value selected from a plurality of index values corresponding to a plurality of possible combinations of LBT bandwidth(s) being acquired for downlink transmission within the unlicensed spectrum BWP or CC.

In some embodiments, the respective bandwidth for each segment is the union bandwidth of downlink transmission bursts in the segment.

Figure 10:
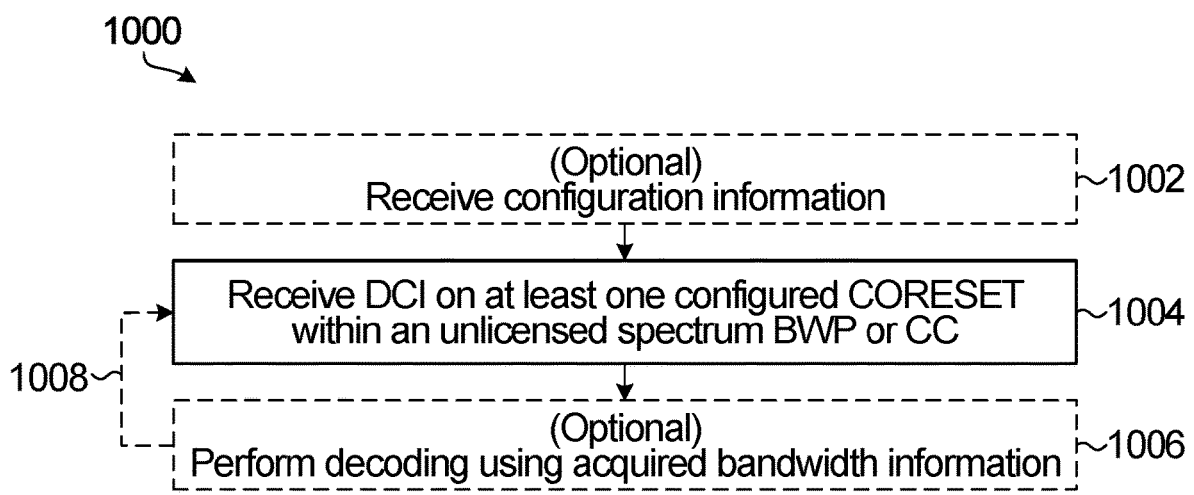
FIG. 10 is a flow diagram of example operations in an ED in accordance with an embodiment of the present disclosure.

FIG. 10 is a flow diagram of example operations 1000 in an ED in accordance with an embodiment of the present disclosure.

Optionally, in block 1002, the ED receives configuration information to configure the ED to periodically monitor for DCI on each of a plurality of configured CORESETs within an unlicensed spectrum BWP or CC. Each configured CORESET of the plurality of configured CORESETs corresponding to a respective frequency domain and/or time domain search space within the unlicensed spectrum BWP or CC. The configuration information may be received through RRC signaling, for example.

In block 1004, the ED receives DCI on at least one of the configured CORESETs configured within the unlicensed spectrum BWP or CC, the DCI being received within a configured monitoring window within a configured monitoring period in the time domain and including an acquired bandwidth indication for indicating at least one bandwidth within the unlicensed spectrum BWP or CC.

Optionally, in block 1006, the ED performs decoding using the acquired bandwidth indication to receive one or more downlink transmission bursts within an acquired bandwidth of the unlicensed spectrum BWP or CC. For example, this may involve dumping LLR decoding information for a bandwidth that is not indicated as an acquired bandwidth when performing HARQ combining with a re-transmission and/or excluding at least one bandwidth that is not indicated as an acquired bandwidth when performing decoding for subsequent scheduled time units of the current monitoring period.

The ED may then return to block 1004, as indicated at 1008, to again monitor for DCI carrying a bandwidth indication on the configured CORESETs in accordance with the configured monitoring period.

The example operations 1000 are illustrative of an example embodiment. Various ways to perform the illustrated operations, as well as examples of other operations that may be performed, are described herein. Further variations may be or become apparent.

For example, in some embodiments, for each of the at least one bandwidth indicated, the acquired bandwidth indication corresponds to a period of time associated with the indicated bandwidth, the period of time being defined in terms of at least one of: a number of time units before a time unit in which the DCI is received; a number of time units after the time unit in which the DCI is received; a first time period before the time at which the DCI is received; and a second time period after the time at which the DCI is received.

In some embodiments, the acquired bandwidth indication indicates at least one acquired bandwidth for downlink transmission within the unlicensed spectrum BWP or CC, or the acquired bandwidth indication indicates at least one punctured bandwidth that is not used for transmission within the unlicensed spectrum BWP or CC.

In some embodiments, the acquired bandwidth indication indicates at least one acquired bandwidth for downlink transmission within the unlicensed spectrum BWP or CC, the downlink transmission being initiated by the base station within an indication period defined at or after the end of a preceding monitoring window and up to the end of a downlink transmission burst in which the DCI carrying the acquired bandwidth indication is received.

In some embodiments, the indication period comprises a plurality of segments of time, and the acquired bandwidth indication indicates a respective bandwidth for each segment of time.

In some embodiments, the operations 1000 further include, the ED determining, for each of the at least one acquired bandwidth, the acquired bandwidth is relevant to a PDSCH for the ED by comparing a starting time unit associated with the PDSCH to the starting time unit indicated by the acquired bandwidth indication, or by comparing an ending time unit associated with the PDSCH to the ending time unit indicated by the acquired bandwidth indication.

In some embodiments, the indication period is defined in terms of a number of time units. In such embodiments, downlink transmission bursts transmitted by the base station may have starting and/or ending points that are aligned to boundaries of the time units. Furthermore, the acquired bandwidth indication may indicate a starting time unit or an ending time unit of a time period associated with each of the at least one acquired bandwidth, wherein the starting time unit or the ending time unit of the time period aligns with the staring or ending point of the at least one downlink transmission burst, respectively.

In some embodiments, the DCI includes an integer number X of bits for carrying the information indicating at least one bandwidth within the unlicensed spectrum BWP or CC and the information that, for each indicated bandwidth indicates an associated period of time. The X bits may include an integer number $N_{BW\_ind\_fields}$ of bandwidth indication fields, each bandwidth indication field including an integer number M of indication bits indicating a bandwidth and an integer number p of indication bits indicating a time unit index of an associated time unit.

In some embodiments, the number $N_{BW\_ind\_fields}$ of bandwidth indication fields and the number p of indication bits indicating a time unit index satisfy the following equations: $p=\text{ceil}(\log_2 P)$, where ceil( ) is the ceiling function; and $N_{BW\_ind\_fields}=\text{floor}(X/(M+p))$, where floor( ) is the floor function.

In some embodiments, for each of the $N_{BW\_ind\_fields}$ bandwidth indication fields, the time unit index indicated by the p indication bits of the bandwidth indication field indicates an ending time unit index of the time period associated with the bandwidth indicated by the M indication bits of the bandwidth indication field.

In some embodiments, for each of the $N_{BW\_ind\_fields}$ bandwidth indication fields, the time unit index indicated by the p indication bits of the bandwidth indication field indicates a starting time unit index of the time period associated with the bandwidth indicated by the M indication bits of the bandwidth indication field.

In some embodiments, the p indication bits in a bandwidth indication field associated with at least one time unit after the time unit in which the DCI is transmitted indicate a time unit index of an associated time unit in the next monitoring period.

In some embodiments, the operations 1000 further include the ED determining a bandwidth indication for forthcoming time units of the downlink transmission burst containing the DCI based on the transition of the time unit index to an associated time unit in the next monitoring period.

In some embodiments, the information indicating at least one bandwidth within the unlicensed spectrum BWP or CC comprises a bit map indicating which LBT bandwidth(s) are acquired for downlink transmission within the unlicensed spectrum BWP or CC.

In some embodiments, the information indicating at least one bandwidth within the unlicensed spectrum BWP or CC comprises an index value selected from a plurality of index values corresponding to a plurality of possible combinations of LBT bandwidth(s) being acquired for downlink transmission within the unlicensed spectrum BWP or CC.

In some embodiments, the respective bandwidth for each segment is the union bandwidth of downlink transmission bursts in the segment.

Figure 11:
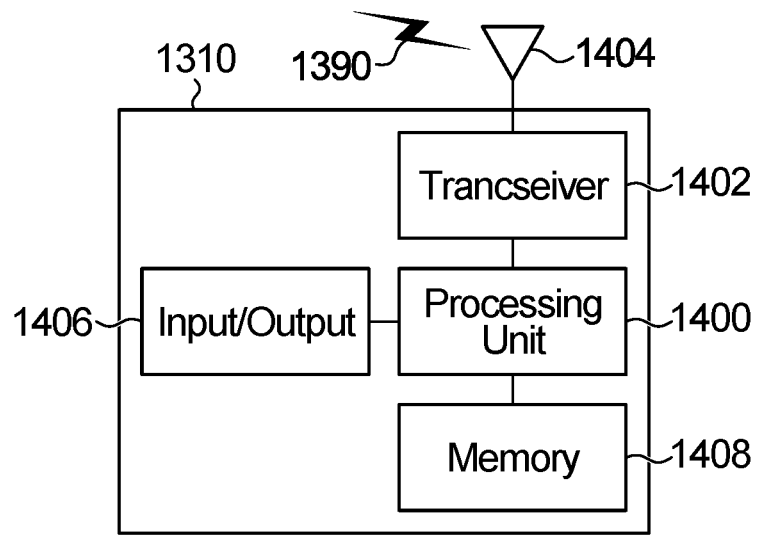
FIG. 11 is a block diagram of an example ED in accordance with an embodiment of the present disclosure.
Figure 12:
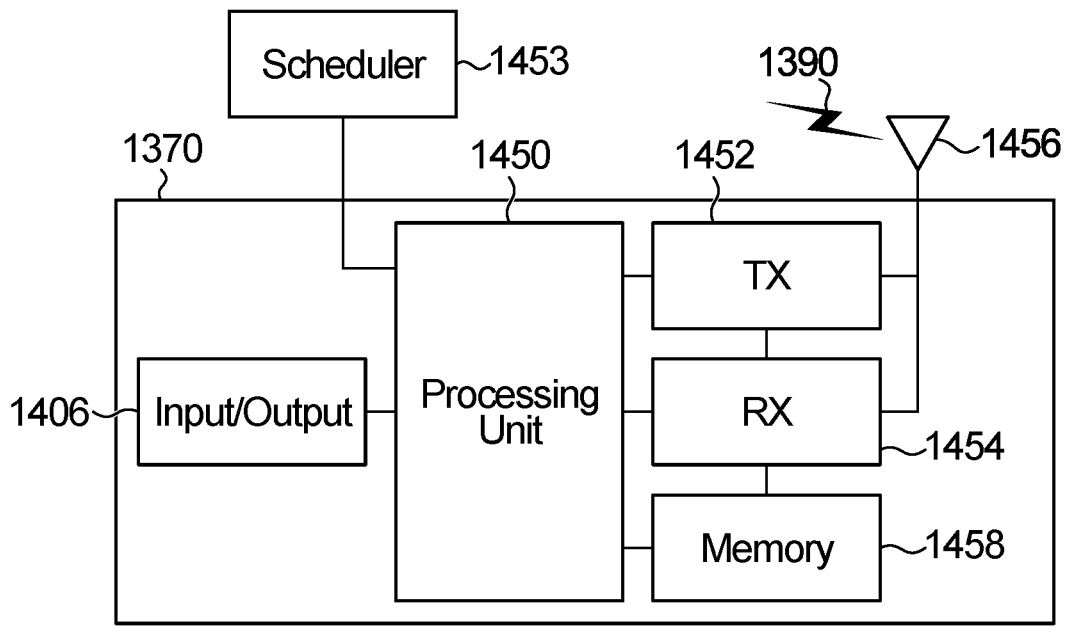
FIG. 12 is a block diagram of an example base station in accordance with an embodiment of the present disclosure.

FIGS. 11 and 12 illustrate example devices that may implement the methods and teachings according to this disclosure. In particular, FIG. 11 illustrates an example ED 110, and FIG. 12 illustrates an example base station 1370. These components could be used in the communication system 100 shown in FIG. 1 or in any other suitable system.

As shown in FIG. 11, the ED 1310 includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 100. The processing unit 1400 may also be configured to implement some or all of the functionality and/or embodiments described in more detail above. Each processing unit 200 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310. One or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the internet 150). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 1310. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12, the base station 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 1370. The processing unit 1450 implements various processing operations of the base station 1370, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310. The memory 1458 stores instructions and data used, generated, or collected by the base station 1370. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding EDs and base stations are known to those of skill in the art. As such, these details are omitted here for clarity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other figures are also intended solely for illustrative purposes.

Other implementation details could also vary between different embodiments. For example, some of the examples above refer to NR and LTE terminology. However, the embodiments disclosed herein are not in any way limited to NR or LTE systems.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

We claim:

1. A method comprising:
performing, by a base station, a listen before talk (LBT) procedure on an unlicensed spectrum bandwidth part (BWP) or component carrier (CC), the unlicensed spectrum BWP or CC including a plurality of sub-bands; and
transmitting, from the base station, downlink control information (DCI) in a group common physical downlink control channel (PDCCH) on at least one configured control resource set (CORESET) of a plurality of CORESETs configured in the frequency and/or time domain, each configured CORESET of the plurality of configured CORESETs corresponding to a respective frequency domain and/or time domain search space within the unlicensed spectrum BWP or CC,
wherein the DCI is transmitted within a configured monitoring window within a configured monitoring period in the time domain, and wherein the DCI comprises an acquired LBT bandwidth indication that indicates, based on the LBT procedure, at least one available LBT bandwidth within the unlicensed spectrum BWP or CC of the at least one CORESET or at least one of the plurality of CORESETs, the at least one available LBT bandwidth being identified as available for reception of a downlink transmission via the LBT procedure, the at least one available LBT bandwidth indicated in the DCI being a subset of the plurality of sub-bands of the unlicensed spectrum BWP or CC, and the DCI further including a time period indication indicating a number of time units that the at least one available LBT bandwidth remains available after a time unit in which the DCI is transmitted.

2. The method of claim 1, the time period indication in the DCI further indicating at least one of:
a number of time units before a time unit in which the DCI is transmitted;
a first time period before a time at which the DCI is transmitted; or
a second time period after the time at which the DCI is transmitted.

3. The method of claim 1, wherein the acquired LBT bandwidth indication indicates at least one acquired LBT bandwidth for the downlink transmission within the unlicensed spectrum BWP or CC, or the acquired LBT bandwidth indication indicates at least one punctured bandwidth that is not used for transmission within the unlicensed spectrum BWP or CC.

4. The method of claim 1, wherein the acquired LBT bandwidth indication indicates at least one acquired LBT bandwidth for the downlink transmission within the unlicensed spectrum BWP or CC, the downlink transmission being initiated by the base station within an indication period defined at or after the end of a preceding monitoring window and up to the end of the downlink transmission burst in which the DCI carrying the acquired LBT bandwidth indication is transmitted.

5. The method of claim 4, wherein:
the indication period comprises a plurality of segments of time; and
the acquired LBT bandwidth indication indicates a respective bandwidth for each segment of time.

6. The method of claim 4, wherein:
the indication period is defined in terms of a number of time units;

downlink transmission bursts transmitted by the base station have starting and/or ending points that are aligned to boundaries of the time units;

the acquired LBT bandwidth indication indicates a starting time unit or an ending time unit of a time period associated with each of the at least one acquired LBT bandwidth; and the starting time unit or the ending time unit of the time period aligns with the staring or ending point of a corresponding downlink transmission burst, respectively.

7. The method of claim 1, the performing the LBT procedure comprising:

performing a separate sub-band LBT procedure for each of the plurality of sub-bands of the unlicensed spectrum BWP or CC.

8. The method of claim 1, wherein each sub-band of the plurality of sub-bands corresponds to a different configured CORESET of the plurality of configured CORESETs.

9. The method of claim 1, wherein LBT bandwidth indication indicates the at least one available LBT bandwidth within the unlicensed spectrum BWP or CC by indicating whether each sub-band of the plurality of sub-bands of the unlicensed spectrum BWP or CC is available.

10. A method comprising:

receiving, by an electronic device (ED) from a base station, downlink control information (DCI) over a group common physical downlink control channel (PDCCH) on at least one configured control resource set (CORESET) of a plurality of CORESETs configured in the frequency and/or time domain, each configured CORESET of the plurality of configured CORESETs corresponding to a respective frequency domain and/or time domain search space within an unlicensed spectrum bandwidth part (BWP) or component carrier (CC), the unlicensed spectrum BWP or CC including a plurality of sub-bands, wherein the DCI is received within a configured monitoring window within a configured monitoring period in the time domain, and wherein the DCI comprises an acquired listen before talk (LBT) bandwidth indication that indicates, based on an LBT procedure, at least one available LBT bandwidth within the unlicensed spectrum BWP or CC of the at least one CORESET or at least one of the plurality of CORESETs, the at least one available LBT bandwidth being identified as available for reception of a downlink transmission via the LBT procedure, the at least one available LBT bandwidth indicated in the DCI being a subset of the plurality of sub-bands of the unlicensed spectrum BWP or CC, and the DCI further including a time period indication indicating a number of time units that the at least one available LBT bandwidth remains available after a time unit in which the DCI is received.

11. The method of claim 10, further comprising receiving, from the base station, configuration information to configure the ED to periodically monitor, within the configured monitoring window of each configured monitoring period, for the DCI on the corresponding frequency domain and/or time domain search space of each of the plurality of configured CORESETs.

12. The method of claim 10, the time period indication in the DCI further indicating at least one of:

a number of time units before a time unit in which the DCI is received;

a first time period before a time at which the DCI is received; or a second time period after the time at which the DCI is received.

13. The method of claim 10, wherein the acquired LBT bandwidth indication indicates at least one acquired LBT bandwidth for reception of the downlink transmission within the unlicensed spectrum BWP or CC, or the acquired LBT bandwidth indication indicates at least one punctured bandwidth that is not used for transmission within the unlicensed spectrum BWP or CC.

14. The method of claim 10, wherein the acquired LBT bandwidth indication indicates at least one acquired LBT bandwidth for reception of the downlink transmission within the unlicensed spectrum BWP or CC, the downlink transmission being initiated by the base station within an indication period defined at or after the end of a preceding monitoring window and up to the end of a downlink transmission burst in which the DCI carrying the acquired LBT bandwidth indication is received.

15. The method of claim 14, wherein:

the indication period comprises a plurality of segments of time; and the acquired LBT bandwidth indication indicates a respective bandwidth for each segment of time.

16. The method of claim 14, wherein:

the indication period is defined in terms of a number of time units;

downlink transmission bursts transmitted by the base station have starting and/or ending points that are aligned to boundaries of the time units;

the acquired LBT bandwidth indication indicates a starting time unit or an ending time unit of a time period associated with each of the at least one acquired LBT bandwidth; and the starting time unit or the ending time unit of the time period aligns with the staring or ending point of a corresponding downlink transmission burst, respectively.

17. The method of claim 16, further comprising, for each of the at least one acquired LBT bandwidth, determining the acquired LBT bandwidth is relevant to a physical downlink shared channel (PDSCH) for the ED by comparing a starting time unit associated with the PDSCH to the starting time unit indicated by the acquired LBT bandwidth indication, or by comparing an ending time unit associated with the PDSCH to the ending time unit indicated by the acquired LBT bandwidth indication.

18. A base station comprising:

a wireless receiver;

a wireless transmitter; and a processing unit operatively connected to the wireless receiver and the wireless transmitter, the processing unit configured to:

perform a listen before talk (LBT) procedure on an unlicensed spectrum bandwidth part (BWP) or component carrier (CC), the unlicensed spectrum BWP or CC including a plurality of sub-bands; and transmit downlink control information (DCI) in a group common physical downlink control channel (PDCCH) on at least one configured control resource set (CORESET) of a plurality of CORESETs configured in the frequency and/or time domain, each configured CORESET of the plurality of configured CORESETs corresponding to a respective frequency domain and/or time domain search space within the unlicensed spectrum BWP or CC, wherein the processing unit is configured to transmit the DCI within a configured monitoring window within a configured monitoring period in the time domain, and wherein the DCI comprises an acquired LBT bandwidth indication that indicates, based on the LBT procedure, at least one available LBT bandwidth within the unlicensed spectrum BWP or CC of the at least one CORESET or at least one of the plurality of CORESETs, the at least one available LBT bandwidth being identified as available for reception of a downlink transmission via the LBT procedure, the at least one available LBT bandwidth indicated in the DCI being a subset of the plurality of sub-bands of the unlicensed spectrum BWP or CC, and the DCI further including a time period indication indicating a number of time units that the at least one available LBT bandwidth remains available after a time unit in which the DCI is received.

19. The base station of claim 18, the time period indication in the DCI further indicating at least one of:
a number of time units before a time unit in which the DCI is transmitted;
a first time period before a time at which the DCI is transmitted; or
a second time period after the time at which the DCI is transmitted.

20. The base station of claim 18, wherein the acquired LBT bandwidth indication indicates at least one acquired LBT bandwidth for the downlink transmission within the unlicensed spectrum BWP or CC, or the acquired LBT bandwidth indication indicates at least one punctured bandwidth that is not used for transmission within the unlicensed spectrum BWP or CC.

21. The base station of claim 18, wherein the acquired LBT bandwidth indication indicates at least one acquired LBT bandwidth for the downlink transmission within the unlicensed spectrum BWP or CC, the downlink transmission being initiated by the base station within an indication period defined at or after the end of a preceding monitoring window and up to the end of a downlink transmission burst in which the DCI carrying the acquired LBT bandwidth indication is transmitted.

22. The base station of claim 21, wherein:
the indication period comprises a plurality of segments of time; and
the acquired LBT bandwidth indication indicates a respective bandwidth for each segment of time.

23. The base station of claim 21, wherein:
the indication period is defined in terms of a number of time units;
downlink transmission bursts transmitted by the base station have starting and/or ending points that are aligned to boundaries of the time units;
the acquired LBT bandwidth indication indicates a starting time unit or an ending time unit of a time period associated with each of the at least one acquired LBT bandwidth; and
the starting time unit or the ending time unit of the time period aligns with the staring or ending point of a corresponding downlink transmission burst, respectively.

24. An electronic device (ED) comprising:
a wireless receiver;
a wireless transmitter; and
a processing unit operatively connected to the wireless receiver and the wireless transmitter, the processing unit configured to:
receive, from a base station, downlink control information (DCI) over a group common physical downlink control channel (PDCCH) on at least one configured control resource set (CORESET) of a plurality of CORESETs configured in the frequency and/or time domain, each configured CORESET of the plurality of configured CORESETs corresponding to a respective frequency domain and/or time domain search space within an unlicensed spectrum bandwidth part (BWP) or component carrier (CC), the unlicensed spectrum BWP or CC including a plurality of sub-bands,
wherein the processing unit is configured to receive the DCI within a configured monitoring window within a configured monitoring period in the time domain, and wherein the DCI comprises an acquired listen before talk (LBT) bandwidth indication that indicates, based on an LBT procedure, at least one available LBT bandwidth within the unlicensed spectrum BWP or CC of the at least one CORESET or at least one of the plurality of CORESETs, the at least one available LBT bandwidth being identified as available for reception a downlink transmission via the LBT procedure, the at least one available LBT bandwidth indicated in the DCI being a subset of the plurality of sub-bands of the unlicensed spectrum BWP or CC, and the DCI further including a time period indication indicating a number of time units that the at least one available LBT bandwidth remains available after a time unit in which the DCI is received.

25. The ED of claim 24, wherein the processing unit is further configured to receive, from the base station, configuration information to configure the ED to periodically monitor, within the configured monitoring window of each configured LBT monitoring period, for the DCI on the corresponding frequency domain and/or time domain search space of each of the plurality of configured CORESETs.

26. The ED of claim 24, the time period indication in the DCI further indicating at least one of:
a number of time units before a time unit in which the DCI is received;
a first time period before a time at which the DCI is received; or
a second time period after the time at which the DCI is received.

27. The ED of claim 24, wherein the acquired LBT bandwidth indication indicates at least one acquired LBT bandwidth for reception of the downlink transmission within the unlicensed spectrum BWP or CC, or the acquired LBT bandwidth indication indicates at least one punctured bandwidth that is not used for transmission within the unlicensed spectrum BWP or CC.

28. The ED of claim 24, wherein the acquired LBT bandwidth indication indicates at least one acquired LBT bandwidth for reception of the downlink transmission within the unlicensed spectrum BWP, the downlink transmission being initiated by the base station within an indication period defined at or after the end of a preceding monitoring window and up to the end of a downlink transmission burst in which the DCI carrying the acquired LBT bandwidth indication is received.

29. The ED of claim 28, wherein:
the indication period comprises a plurality of segments of time; and
the acquired LBT bandwidth indication indicates a respective bandwidth for each segment of time.

30. The ED of claim 28, wherein:
the indication period is defined in terms of a number of time units;
downlink transmission bursts transmitted by the base station have starting and/or ending points that are aligned to boundaries of the time units;
the acquired LBT bandwidth indication indicates a starting time unit or an ending time unit of a time period associated with each of the at least one acquired LBT bandwidth; and
the starting time unit or the ending time unit of the time period aligns with the staring or ending point of a corresponding downlink transmission burst, respectively.

31. The ED of claim 30, wherein the processing unit is further configured to determine, for each of the at least one acquired LBT bandwidth, the acquired LBT bandwidth is relevant to a physical downlink shared channel (PDSCH) for the ED by comparing a starting time unit associated with the PDSCH to the starting time unit indicated by the acquired LBT bandwidth indication, or by comparing an ending time unit associated with the PDSCH to the ending time unit indicated by the acquired LBT bandwidth indication.

* * * * *